US008155491B2

(12) United States Patent
Lapp

(10) Patent No.: US 8,155,491 B2
(45) Date of Patent: Apr. 10, 2012

(54) CABLE

(75) Inventor: Siegbert Lapp, Stuttgart (DE)

(73) Assignee: Lapp Engineering & Co., Cham (CH)

( * ) Notice: Subject to any disclaimer, the term of this patent is extended or adjusted under 35 U.S.C. 154(b) by 47 days.

(21) Appl. No.: 12/587,402

(22) Filed: Oct. 5, 2009

(65) Prior Publication Data

US 2010/0172618 A1 Jul. 8, 2010

Related U.S. Application Data

(63) Continuation of application No. PCT/EP2008/002641, filed on Apr. 3, 2008.

(30) Foreign Application Priority Data

Apr. 10, 2007 (DE) ........................ 10 2007 017 967

(51) Int. Cl.
*G02B 6/44* (2006.01)
*G02B 6/00* (2006.01)

(52) U.S. Cl. ............................ 385/101; 385/12; 385/14

(58) Field of Classification Search ........................ None
See application file for complete search history.

(56) References Cited

U.S. PATENT DOCUMENTS 4,751,614 A 6/1988 Mehnert
4,880,484 A 11/1989 Obermeier et al.
5,045,368 A 9/1991 Cosman et al.
5,106,175 A 4/1992 Davis et al.
5,305,410 A 4/1994 Arroyo
5,532,598 A 7/1996 Clark, Jr. et al.
5,541,803 A * 7/1996 Pope, Jr. et al.
5,577,147 A 11/1996 Arroyo et al.
5,578,926 A 11/1996 Reinhardt
5,729,966 A 3/1998 Grulick
5,808,779 A * 9/1998 Weis ............................ 359/290
5,892,430 A 4/1999 Wiesman et al.
5,902,251 A 5/1999 vanHooydonk
5,986,207 A 11/1999 Uhlenhuth
6,246,328 B1 6/2001 Parkinson et al.
6,388,575 B1 5/2002 Galloway
6,563,094 B2 5/2003 Kochman et al.
6,791,454 B2 9/2004 Mangold et al.
6,915,050 B2 7/2005 Koyasu et al.
6,973,243 B2 12/2005 Koyasu et al.
7,041,906 B2 5/2006 John
7,158,012 B2 1/2007 Wiesman et al.

(Continued)

FOREIGN PATENT DOCUMENTS

CA 2 581 186 5/2006

(Continued)

*Primary Examiner* — Tina Wong
(74) *Attorney, Agent, or Firm* — Lipsitz & McAllister, LLC

(57) ABSTRACT

In order to improve a cable, comprising an inner cable body, in which at least one conductor strand of an optical and/or electrical conductor runs in the longitudinal direction of the cable, a cable sheath, enclosing the inner cable body and lying between an outer surface of the cable and the inner cable body, and at least one information carrier unit, disposed within the outer surface of the cable, in such a way that statements can be made about the cable, it is proposed that the at least one information carrier unit can be read by electromagnetic field coupling, that the at least one information carrier unit picks up at least one measured value of a sensor associated with it and that the measured value can be read out by a read device.

20 Claims, 20 Drawing Sheets

U.S. PATENT DOCUMENTS

| | | | |
|---|---|---|---|
| 7,170,405 | B2 | 1/2007 | Daum et al. |
| 7,201,221 | B2 * | 4/2007 | Tubel et al. .................... 166/64 |
| 7,223,962 | B2 * | 5/2007 | Fageraas et al. ......... 250/227.14 |
| 7,265,533 | B2 | 9/2007 | Lightbody et al. |
| 7,313,304 | B2 | 12/2007 | Andrews et al. |
| 7,526,163 | B2 | 4/2009 | Freeland et al. |
| 7,539,379 | B2 | 5/2009 | Khoshaba et al. |
| 7,618,291 | B2 | 11/2009 | Standke |
| 7,940,182 | B2 | 5/2011 | Lange et al. |
| 2002/0034365 | A1 | 3/2002 | Vogelsang |
| 2002/0061727 | A1 * | 5/2002 | Mangold et al. |
| 2004/0149488 | A1 * | 8/2004 | John |
| 2004/0156601 | A1 * | 8/2004 | Koyasu et al. |
| 2004/0184747 | A1 * | 9/2004 | Koyasu et al. |
| 2005/0083203 | A1 * | 4/2005 | Surkau |
| 2005/0129088 | A1 * | 6/2005 | Rajendran et al. ............ 374/161 |
| 2005/0140512 | A1 * | 6/2005 | Sakama et al. |
| 2006/0214801 | A1 * | 9/2006 | Murofushi et al. |
| 2008/0218355 | A1 | 9/2008 | Downie et al. |
| 2008/0318477 | A1 | 12/2008 | Standke |
| 2009/0156042 | A1 | 6/2009 | Radenne et al. |
| 2010/0109670 | A1 | 5/2010 | Arnaud et al. |
| 2010/0165557 | A1 | 7/2010 | Lapp |

FOREIGN PATENT DOCUMENTS

| | | | |
|---|---|---|---|
| DE | 17 65 765 | | 8/1971 |
| DE | 36 20 595 | * | 2/1987 |
| DE | 37 43 470 | * | 3/1989 |
| DE | 43 33 121 | | 5/1994 |
| DE | 690 09 113 | | 11/1994 |
| DE | 690 14 521 | | 6/1995 |
| DE | 690 16 035 | | 6/1995 |
| DE | 196 01 651 | | 7/1997 |
| DE | 196 39 902 | | 12/1997 |
| DE | 197 02 536 | * | 7/1998 |
| DE | 198 14 540 | * | 10/1999 |
| DE | 299 21 017 | | 5/2000 |
| DE | 695 16 138 | | 12/2000 |
| DE | 199 55 120 | * | 5/2001 |
| DE | 101 11 371 | * | 9/2002 |
| DE | 101 44 552 | | 2/2004 |
| DE | 20 2004 017 158 | | 2/2005 |
| DE | 10 2004 051 594 | * | 5/2006 |
| DE | 10 2005 006 318 | * | 8/2006 |
| DE | 20 2005 006 373 | | 8/2006 |
| DE | 10 2005 044 918 | | 2/2007 |
| DE | 10 2005 044 482 | * | 4/2007 |
| DE | 10 2005 058 385 | * | 6/2007 |
| DE | 10 2006 036 719 | | 2/2008 |
| DE | 10 2006 036 721 | | 2/2008 |
| EP | 0 408 320 | | 1/1991 |
| EP | 0 419 637 | | 4/1991 |
| EP | 1 191 354 | | 3/2002 |
| EP | 1 220 236 | * | 7/2002 |
| EP | 1 424 882 | | 6/2004 |
| EP | 1 548 639 | | 6/2005 |
| EP | 1 772 657 | | 4/2007 |
| EP | 1 884 811 | | 2/2008 |
| FR | 2 830 941 | * | 4/2003 |
| JP | 2003203527 | | 7/2003 |
| WO | WO 90/10879 | | 9/1990 |
| WO | WO 91/04503 | | 4/1991 |
| WO | WO 95/32439 | | 11/1995 |
| WO | WO 03/067512 | | 8/2003 |
| WO | WO 03/091665 | | 11/2003 |
| WO | WO 2004/072988 | * | 8/2004 |
| WO | 2006/063023 | | 6/2006 |
| WO | 2007/016956 | | 2/2007 |
| WO | 2007/036346 | | 4/2007 |

* cited by examiner

CABLE

This application is a continuation of International application No. PCT/EP2008/002641 filed on Apr. 3, 2008.

This patent application claims the benefit of International application No. PCT/EP2008/002641 of Apr. 3, 2008 and German application No. 10 2007 017 967.9 of Apr. 10, 2007, the teachings and disclosure of which are hereby incorporated in their entirety by reference thereto.

The invention relates to a cable, comprising an inner cable body, in which at least one conductor strand of an optical and/or electrical conductor runs in the longitudinal direction of the cable, a cable sheath, enclosing the inner cable body and lying between an outer surface of the cable and the inner cable body, and at least one information carrier unit, disposed within the outer surface of the cable.

Information carrier units in cables are known from the prior art. They are used for the purpose of storing information concerning the cable, so that this information can then be retrieved.

It is an object of the invention to improve a cable of the generic type in such a way that statements can be made about the cable.

This object is achieved according to the invention in the case of a cable of the type described at the beginning by it being possible for the at least one information carrier unit to be read by electromagnetic field coupling, by the at least one information carrier unit picking up at least one measured value of a sensor associated with it and by it being possible for the measured value to be read out by a read device.

The advantage of the solution according to the invention can be seen in that it enables the information carrier unit not only to be used for making information available for reading-out, but also to be used for providing, by means of the sensor, indications about the state of the cable, for example about physical state variables of the cable.

In particular, such sensing of state variables may take place during the operation of the cable or else independently of the operation of the cable.

Consequently, there is an optimum possibility of, on the one hand, sensing the state of the cable without in-depth investigation of the same, and, on the other hand, of possibly checking the state of the cable, in particular to the extent that potential damage to the conductor strands when certain physical state variables occur can be detected.

In principle, any desired state variables can be picked up with such a sensor, that is to say, in principle all state variables for which sensors that can be installed in cables exist.

A preferred solution provides in this respect that the sensor picks up at least one of the state variables that may lead to the cable becoming damaged—for example if they act for a long time or if certain values are exceeded—such as radiation, temperature, tension, pressure, elongation and moisture.

With regard to the way in which the sensor is formed and the information carrier unit is operated for picking up the measured values, no further details have been specified so far.

An advantageous solution thus provides that the sensor is a sensor which reacts irreversibly to the state variable to be picked up. Such a sensor has the advantage that, even when it is not being actively operated by the information carrier unit, it is capable of picking up state variables, or in particular also changes of state variables, which can subsequently be picked up as a measured value when the information carrier unit is active, since the state variable to be picked up leads to an irreversible change of the measured value produced by the sensor.

However, this solution has the disadvantage that only a one-off measurement is possible, when the measured value exceeds a certain value, and, in particular, it cannot be detected if the measured value subsequently falls below a certain value again.

Another advantageous solution therefore provides that the sensor is a sensor which reacts reversibly to the state variable to be picked up.

A reversibly reacting sensor of this kind is constantly capable of picking up the changes of the state variables, but has the disadvantage that such a sensor only produces a measured value if the information carrier unit is operating this sensor.

This means that, in all cases in which the sensor is not being actively operated by the information carrier unit, the sensor is not capable of detecting the physical state variable, or in particular when a certain value of this physical state variable is exceeded.

With regard to the operation of the information carriers, no further details have been specified. It would therefore be conceivable in principle to operate the information carrier unit by means of an energy store associated with it, for example an accumulator or a battery.

However, this has the effect that the information carrier unit is of a size that is unsuitable for cables.

For this reason, it is preferably provided that the information carrier unit can be activated, and picks up the measured value in the activated state, that is to say that the information carrier unit can only pick up the measured value in the activated state, but is not capable of picking up the measured value in the non-activated state.

In this respect, the information carrier unit can be activated in a very wide variety of ways.

An advantageous exemplary embodiment provides that the information carrier unit can be activated by the read device. That is to say that the read device is capable, on the basis of the inductive electromagnetic field coupling, of transferring to the information carrier unit, in particular the antenna unit of the same, so much energy that the power requirement of the information carrier unit together with the sensor can also be covered in this way.

Another suitable solution provides that the information carrier unit can be activated by an electromagnetic field of a current flowing through the cable.

This solution has the advantage that no activation of the information carrier unit by the read device is required, but rather an alternating electromagnetic field which provides sufficient energy for the operation of the information carrier unit is available independently of the read device, the information carrier unit likewise picking up this energy by way of a suitable antenna.

The current flowing through the cable may, for example, be a current which is variable over time, as is used in the case of drives supplied with pulse-width-modulated current.

The current flowing through the cable may be a current flowing in a data line or a variable-frequency current, as is used in control lines for synchronous motors.

However, it is also conceivable for the current to be a conventional alternating current at a specific frequency, for example including the power-line frequency.

Furthermore, it would be possible for two lines of the cable to be connected in such a way that an electromagnetic field with the standardized carrier frequency of the information carrier units, for example 13.56 MHz, is produced. This would have the advantage that no special measures have to be taken for generating energy in the information carrier units.

In all these cases, the coupling-in of the energy takes place inductively by way of the alternating electromagnetic field produced by this alternating current, into the antenna unit of the information carrier unit.

In principle, it would be sufficient to form the information carrier unit in such a way that it picks up the measured value and then transmits it immediately to the read device.

In order, however, to be able to pick up different measured values at different points in time, for example including during the transmission of other kinds of information between the read device and the information carrier unit, it is preferably provided that the information carrier unit stores the at least one measured value in a memory. In this way, the measured value can be read out at any times desired, that is to say whenever it is requested by the read device.

In particular, there is also the possibility in this respect of then picking up measured values and making them accessible later when the information carrier unit is not interacting with a read device and is, for example, activated by an electromagnetic field of a current flowing through the cable.

Since cables can be expected to have long service lives and the picking up of measured values would then produce a high volume of data, it is suitable to provide a reduction in the amount of data.

This is possible, for example, by the information carrier unit only storing the measured value in the memory if it exceeds a threshold, the threshold being, for example, variably definable.

Defining a threshold consequently allows the unusual states that are relevant with regard to their deviation from usual states to be established, and consequently the measured values to be stored can also be restricted to the measured values that correspond to these unusual states.

Another possible way of reducing the amount of data is that the information carrier unit only stores the measured value in the memory if it lies outside a statistically determined measured value distribution. This solution also creates the possibility of storing only the relevant measured values.

In all cases in which a reduction of the amount of data takes place, in the simplest case the measured value can be picked up as nothing more than the measured value itself. In more complex solutions, it is provided that the measured values are stored in correlation with other parameters, such as for example the time, or other parameters defining the circumstances in which these measured values were picked up.

The sensor may pick up the widest variety of state variables in the cable.

One advantageous solution provides that the sensor comprises state variables of the inner cable body.

Another advantageous solution provides that the sensor picks up state variables of the cable sheath.

Another advantageous solution provides that the sensor, comprises state variables between the inner cable body and the cable sheath.

For example, it is possible with such a solution to pick up relative movements between the inner cable body and the cable sheath.

These relative movements may reach an order of magnitude which causes irreversible damage to the cable, for example an increase in the friction between the inner cable body and the cable sheath.

For example, these excessive relative movements may lead to a separating layer between the inner cable body and the cable sheath becoming damaged, or the inner cable body becoming damaged.

These relative movements may, furthermore, also occur as shear stresses between the inner cable body and the cable sheath and be picked up as such by a shear force sensor.

With regard to the way in which the sensor is formed, no further details have been specified so far.

It is thus advantageous if the sensor is a sensor which varies an electrical resistance in accordance with the physical state variable to be picked up, since an electrical resistance can be easily picked up.

An alternative or additional solution provides that the sensor is a sensor which varies a capacitance in accordance with the physical state variable to be measured, since capacitance can be easily picked up without great electrical power consumption.

Such a sensor can be realized particularly easily and at low cost by a layer structure, in particular a multilayer structure, since layer structures can be easily produced and easily adapted to the respective conditions.

With regard to the way in which the sensor is disposed in relation to the information carrier unit, furthermore, no further details have been specified.

One solution provides that the sensor is disposed outside an integrated circuit of the information carrier unit. This solution makes it possible to use the sensor, for example, for picking up tensile forces, shear forces, elongations or excessive elongations.

However, it is also conceivable to use the sensor for measuring radiation, temperatures or pressure at specific points of the cable, for example in the inner cable body or in the separating layer or in the cable sheath.

Such a solution makes it necessary, however, to produce and maintain a stable and lasting electrical connection between the sensor and the integrated circuit.

For these reasons, as an alternative to this, another suitable solution provides that the sensor is disposed on the integrated circuit. This solution has the advantage that the sensor can be produced with the integrated circuit in a simple manner and that far fewer problems occur in maintaining the sensor in working order, since the sensor and the part of the integrated circuit carrying it are fixedly connected to each other.

In the simplest case, the sensor may be provided as a component of the integrated circuit and comprises a temperature in the surroundings of the integrated circuit.

It is also conceivable, however, to form the sensor as a moisture sensor, which picks up the moisture occurring in the region of the integrated circuit.

With regard to the way in which the information carrier unit itself is formed, no further details have been specified so far.

An advantageous embodiment thus provides that the information carrier unit comprises a base.

In all the cases in which the information carrier unit comprises a base, there is the possibility of disposing the sensor such that it is free from the base; this is advantageous in particular when good coupling of the sensor to the physical state variables to be measured is intended. For example, this is useful whenever the sensor is intended to directly pick up forces, tension, elongations or shear stresses, or else radiation or temperature or moisture, at defined points of the cable.

In these cases, however, a good and lasting electrical connection between the sensor and the components disposed on the base, in particular the integrated circuit, should be ensured.

For this reason, as an alternative to this, an advantageous solution provides that the sensor is disposed on the base. This solution has the advantage that the stability of the base can therefore be used also to position the sensor permanently and in a stable manne in relation to the integrated circuit, and consequently to introduce the entire information carrier unit together with the sensor into the cable easily when the cable is produced, and consequently also to be able to operate it later with the necessary long-term stability.

In this case, it is provided that an integrated circuit of the information carrier unit is disposed on the base.

Furthermore, it is suitably provided in this case that a conductor acting as an antenna is disposed on the base.

The antenna may in this case be produced from conductor tracks, produced by a lacquer applied to the base. An embodiment in which the antenna is applied to the base by a printing operation is particularly advantageous.

For example, in one embodiment it is conceivable that the base is a rigid body.

The base may be, for example, a plate or at least part of an embedding body in which the integrated circuit and the conductor for the antenna are at least partially embedded.

Consequently, the base is, for example, at least part of an embedding body enclosing the integrated circuit and the antenna.

As an alternative to this, it is provided that the base is made of a flexible material, for example flat material.

A flexible material of this kind could be, for example, a resiliently flexible material.

It is particularly advantageous, however, for introducing the information carrier units with the base into the cable if the flexible material is a so-called pliant material.

In order furthermore, however, to avoid damage to the integrated circuit and/or possibly to the sensor and/or to the conductor forming the antenna, and in particular also the terminals between the integrated circuit, and/or possibly the sensor and/or the conductor forming the antenna, it is preferably provided that the flexible material is resistant to tension in at least one direction.

In the case in which the base is formed as an element which is resistant to tension in one direction and in the case in which the sensor is formed as a tension, pressure or elongation sensor, it is advantageous if the sensor either extends transversely to the direction that is resistant to tension or if the sensor is disposed outside the base.

With regard to the number of information carrier units, no further details have been specified so far.

An advantageous embodiment thus provides that one information carrier unit is prescribed for each cable. This has the disadvantage, however, that there is then the problem of using the read device to find the one information carrier unit of the cable in order to read out the information stored in it, in particular the measured values.

For this reason, it is advantageously provided that a multiplicity of information carrier units are disposed on the carrier strand.

The multiplicity of information carrier units could in principle be disposed at any desired intervals on the carrier strand.

In order to make it possible for the information carrier units to be reliably found, it is preferably provided that the information carrier units are disposed at defined regular intervals in the longitudinal direction of the cable.

The defined regular intervals could also specify variable distances, for example shorter distances at the ends of the cable that increase toward the middle.

In the simplest case, however, it is suitable if the defined regular intervals for the information carrier units determine a uniform distance between the information carrier units in the longitudinal direction of the cable.

In principle, sensors could only be associated with individual units among the multiplicity of information carrier units.

It is particularly suitable, however, if all the information carrier units have an associated sensor.

Furthermore, the information carrier units have in the longitudinal direction of the cable a reading/writing range, which depends on the frequency at which they are operated and also how the antenna is formed.

In order to avoid to successively disposed information carrier units being addressed, it is preferably provided that the information carrier units are disposed at the defined regular intervals in relation to one another in such a way that the distances between the information carrier units correspond to at least 2 times a reading/writing range of the information carrier units in the direction of each of the nearest information carrier units.

It is still better if the distances correspond to at least 2.5 times the reading/writing range of the information carrier units in the direction of the nearest information carrier unit.

With regard to the structure of the information carrier units, no further details have been specified so far.

An advantageous solution provides that the information carrier unit has at least one memory for the information that can be read out.

Such a memory could be formed in a very wide variety of ways. For example, the memory could be formed such that the information stored in it can be overwritten by the read device.

However, a particularly advantageous solution provides that the memory has a memory area in which items of information once written are stored such that they are write-protected.

Such a memory area is suitable, for example, for storing an identification code for the information carrier unit or other data specific to this information carrier unit, which can no longer be changed by any of the users.

Such a memory area is also suitable, however, for the cable manufacturer to store information which is not to be overwritten. Such information is, for example, cable data, cable specifications or else details of the type of cable and how it can be used.

However, these data may, for example, also be supplemented by data comprising details about the manufacture of this specific cable or data representing test records from final testing of the cable.

In addition, a memory according to the invention may also be formed furthermore in such a way that it has a memory area in which items of information are stored such that they are write-protected by an access code.

Such write-protected storage of information may, for example, comprise data which can be stored by a user. For example, after preparation of the cable, a user could store in the memory area data concerning the preparation of the cable or concerning the overall length of the cable or concerning the respective portions over the length of the cable, the user being provided by the cable manufacturer with an access code for this purpose, in order to store these data in the memory area.

A further advantageous embodiment provides that the memory has a memory area to which information can be freely written.

Such a memory area may, for example, receive information which is to be stored by the cable user in the cable, for example concerning the type of installation or the preparation of the same, or else the measured values of the associated sensor.

In particular when a number of information carrier units are used, it would be conceivable, for example, for it to be possible for all the information carrier units to be addressed with one access code. However, this has the disadvantage that it is consequently only with great effort that the information carrier units can be selectively used, for example to assign different information to specific portions of the cable.

One conceivable solution for assigning different information to different portions of the cable would be to assign the measured values of the respective sensor and/or also a different indication of the length, so that, by reading out the specified length of an information carrier unit, its distance from one of the ends of the cable or from both ends of the cable can, for example, be determined.

For this reason, it is advantageous if each of the information carrier units can be individually addressed by an access code.

In connection with the description so far of the information carrier units, it has just been assumed that they carry the measured values of the associated sensor as information or information which has been stored in the information carrier units by external read/write devices either before or during the production of the cable or during the use of the cable.

With regard to the way in which the information carrier unit is disposed in the cable, no further details have been specified so far. The information carrier unit may be provided in the cable in a very wide variety of ways.

A particularly advantageous solution provides that a carrier strand is associated with the inner cable body, the carrier strand running over the length of the inner cable body, that at least one information carrier unit that can be read by electromagnetic field coupling is disposed on the carrier strand and that the carrier strand is covered over by the cable sheath.

The advantage of this solution can be seen in that the carrier strand provides an optimum possible way of positioning the information carrier unit optimally in the cable, and consequently also allows, in particular, low-cost, easy production of the cable.

Furthermore, the solution according to the invention also provides a possible way of improving the ease with which the information carrier unit can be read and located by way of the defined positioning of said information carrier unit, since the solution according to the invention has provided a possible way of disposing the information carrier unit in a defined manner that also allows information carrier units to be used that can, for example, only be read over short ranges.

The statement that the information carrier unit is intended to be readable by electromagnetic field coupling is to be understood here as meaning that the reading of the information carrier unit is intended to be possible not only in the LF range but also in the HF range or in the UHF range.

With regard to the way in which the carrier strand is disposed in the cable, no further details have been specified so far.

An exemplary embodiment thus provides that the carrier strand runs parallel to a longitudinal direction of the inner cable body. This means that the carrier strand runs, for example, along the inner cable body over the entire length of the same.

For example, this can be easily realized by the carrier strand being formed as a filler tape which, during the production of the cable, is fed to the inner cable body, which is possibly provided with a separating layer, adheres to said body and is then covered over by the cable sheath produced by extrusion.

As an alternative to the carrier strand running parallel to a longitudinal direction of the inner cable body, another exemplary embodiment provides that the carrier strand runs such that it wraps around the at least one conductor strand of the inner cable body, in particular wraps around it substantially over its complete area.

A wrapping-around run of this kind can be realized in a very wide variety of ways.

An advantageous solution thus provides that the carrier strand is formed such that it winds around the inner cable body, and consequently spirally surrounds the inner cable body, in particular also in a substantially area-covering manner, it being possible in this case for the alignment of the carrier strand to be entirely independent of a twisting direction of the conductor strand.

It is, however, also conceivable in another case for the carrier strand to run approximately parallel to a twisting direction of the at least one conductor strand. In this case the carrier strand can, for example, be twisted along with said conductor strand during the production of the cable.

In this case, the carrier strand may be a carrier strand that is independent of the inner cable body. The carrier strand may, however, also be formed as part of the inner cable body, that is for example when the carrier strand runs in the form of an interstitial cord of the inner cable body.

Furthermore, the carrier strand may be disposed in various ways in relation to the inner cable body in connection with realizing the solution according to the invention.

For example, it is conceivable for the carrier strand to lie directly on the inner cable body.

However, it is also conceivable for the carrier strand to be at least part of a separating layer between the inner cable body and the cable sheath.

A further possibility provides that the carrier strand lies on a separating layer between the inner cable body and the cable sheath.

Furthermore, the information carrier unit may still be disposed in various ways in relation to the carrier strand.

One possible way of doing this is that the information carrier unit is disposed on a side of the carrier strand that is facing the inner cable body.

For example, this is conceivable when either the information carrier unit lies directly on the inner cable body or the carrier strand lies on the separating layer, so that the information carrier unit is then disposed between the carrier strand and the separating layer.

Another advantageous solution provides that the information carrier unit is disposed on a side of the carrier strand that is facing away from the inner cable body.

In the case of this solution, it is conceivable, for example, to place the carrier strand directly on the inner cable body, so that the information carrier unit can then, for example, be covered over by the separating layer.

However, it is also conceivable for the information carrier unit to be covered over directly by the cable sheath.

A further possibility provides that the information carrier unit is embedded in the carrier strand. This is the case, in particular, when the carrier strand runs in the form of an interstitial cord in the inner cable body.

With regard to the connection of the sensor to the carrier strand, no further details have been specified so far.

In principle, for example, if temperature or moisture in the vicinity of the carrier strand should be measured, the sensor may be disposed on the carrier strand.

The carrier strand itself may, however, also be used as a transmission element for tension or elongations in the cable, so that in this case likewise at least an end region of the sensor is fixedly connected to the carrier strand and picks up the extent to which tensile forces or forces of elongation act on the carrier strand.

As an alternative to this, however, it is also conceivable for at least an end region of the sensor to be connected either to the inner cable body or to the cable sheath or to both, in order to pick up state variables caused by movements of the cable that affect them or both of them.

With regard to the connection of a base of the information carrier unit to the carrier strand, likewise no further details have been specified so far.

An advantageous solution thus provides that the base is fixed to a carrier strand carrying the information carrier unit.

For example, it is provided in this case that the base is fixed to the carrier strand by way of at least one connecting point.

A solution of this kind does not in this case require full-area bonding of the base to the carrier strand, but rather it, is adequate, for example, for the base to be bonded to the carrier strand partially or in certain portions.

In particular, it is advantageous in this respect if the at least one connecting point is an adhesive point.

As an alternative to this, it is conceivable for the carrier strand to form a portion of the base.

This is the case, for example, when the carrier strand is an interstitial cord in which the integrated circuit and the conductor for the antenna are embedded.

However, it is also conceivable to produce the entire carrier strand from a material that is suitable as a base for the information carrier unit, for example from a pliant strip material.

Another alternative for disposing the information carrier unit provides that the information carrier unit is disposed on an intermediate sheath lying between the inner cable body and an outer cable sheath.

This solution has the advantage that it likewise easily provides a possible way of disposing the information carrier unit in the cable.

With regard to the way in which the sensor is disposed with such a disposition of the information carrier unit on the intermediate sheath, no specific details have been given so far.

An advantageous solution thus provides that the sensor is likewise disposed on the intermediate sheath. In this case, the sensor can, for example, be placed on a surface of the intermediate sheath.

However, it is also conceivable for the sensor to be at least partly embedded in the intermediate sheath.

For the protection of the sensor, in particular while it is being applied, it is still more advantageous, however, if the sensor is predominantly embedded in the intermediate sheath, since in this way it is possible for the sensor to be largely protected, and also the connection between the sensor and, for example, the integrated circuit of the information carrier unit can be easily ensured in a stable and lasting manner in that, for example, the sensor is applied with the integrated circuit of the information carrier unit at the same time to the intermediate sheath and embedded in it. Particularly good protection is possible if the sensor is embedded substantially completely in the intermediate sheath, so that no damage to the sensor can take place when the outer sheath is applied.

However, it is also conceivable to dispose the sensor in relation to the intermediate sheath in such a way that the sensor is at least partly embedded in the outer cable sheath, in order also to be able to pick up physical state variables in the outer cable sheath.

In an extreme case, it is even advantageous to dispose the sensor completely on the surface of the intermediate sheath, and consequently embed it in the outer sheath, so that a far better connection takes place between the outer sheath and the sensor than between the sensor and the intermediate sheath.

If, however, it is intended, for example, to pick up shear forces between the outer sheath and the intermediate sheath, the sensor should be fixedly connected on one side to the intermediate sheath and on the other side to the outer sheath.

In particular, it is in this case advantageous if the information carrier unit is at least partly embedded in the intermediate sheath, in order to make it possible to fix the information carrier unit to the intermediate sheath, so that, after production of the intermediate sheath and embedding of the information carrier unit, the outer cable sheath surrounds both the intermediate sheath and the information carrier unit in a protective manner.

In particular, it is provided in this respect that the integrated circuit of the information carrier unit is at least partly embedded in the intermediate sheath.

It is particularly advantageous in this case if the integrated circuit is predominantly embedded in the intermediate sheath.

It is still better if the integrated circuit is embedded substantially completely in the intermediate sheath.

With regard to the way in which the antenna unit is disposed, likewise no further details have been specified. It would, for example, thus be conceivable for the antenna unit of the information carrier unit to be disposed on a surface of the intermediate sheath.

For example, it would be conceivable to place the antenna unit on the surface of the intermediate sheath.

Another suitable solution provides that the antenna unit is also at least partly embedded in the intermediate sheath.

It is particularly advantageous if the antenna unit is also predominantly embedded in the intermediate sheath. A still more advantageous solution provides that the antenna unit is embedded substantially completely in the intermediate sheath.

With regard to the way in which the antenna unit is disposed, a very wide variety of solutions are conceivable.

One solution provides that the antenna unit is formed by an antenna wire, it being possible for the antenna wire either to lie exposed on the intermediate sheath or to be embedded in it.

However, it is suitable for reasons of ease of assembly of the antenna unit if the antenna wire is also disposed on the base.

Another advantageous solution provides that the antenna unit is applied as a conductor track on a base.

For example, it is suitable here if the base lies against the surface of the intermediate sheath.

The base may in this case lie on the surface of the intermediate sheath.

It is still more advantageous if the base is at least partially embedded in the intermediate sheath.

A particularly suitable solution provides that the base is predominantly embedded in the intermediate sheath.

However, it is also possible to embed the base substantially completely in the intermediate sheath.

Another suitable solution provides that the antenna unit is formed as a conductor track disposed directly on the surface of the intermediate sheath. That is to say that the intermediate sheath itself forms the base on which the conductor track is held.

A suitable solution provides in this respect that the conductor track is formed by a conducting material applied to the intermediate sheath.

In the simplest case, the conductor track may be printed on the intermediate sheath by a printing operation.

Another advantageous solution provides that the conductor track is embedded in the intermediate sheath by printing, and consequently still more advantageous fixing of the conductor track to the intermediate sheath is obtained, in particular when the integrated circuit is also at least partially embedded in the intermediate sheath.

With regard to the forming of the intermediate cable sheath and the outer cable sheath, no further details have been specified in connection with the exemplary embodiments described so far. In principle, the outer cable sheath may be an opaque cable sheath, in particular comprising fillers.

However, in order to be able, for example, to detect the information carrier unit, an advantageous solution provides that the outer cable sheath comprises a material that is transparent in the visible spectral range, so that the outer cable sheath makes it possible, because of its transparency, to establish the location of the disposition of the information carrier unit in the longitudinal direction of the cable by optical examination of the cable.

This has the great advantage that reading out the information from one of the information carrier units of the cable is made easier, since the location of the information carrier unit can be easily established through the transparent cable sheath.

A further possible way of detecting the location of the information carrier unit that is easy and reliable for a user provides that the outer cable sheath carries an inscription and that the inscription is disposed in a defined relationship with the location of the information carrier unit, so that the inscription makes it possible to find the location of the information carrier unit in an easy way.

In this respect there is a very wide range of possible ways of generating such a relationship with the inscription. For example, it is conceivable to dispose the information carrier unit either at the beginning or at the end of the inscription.

However, it is also conceivable to leave a gap in the inscription, which indicates where the information carrier unit is disposed in relation to the inscription.

As an alternative to this, however, it is also conceivable to provide special inscription symbols in the region of the inscription, which then comprise details of the location of the sensor.

Further features and advantages of the invention are the subject of the description and of the pictorial representation of some exemplary embodiments.

Figure 1:
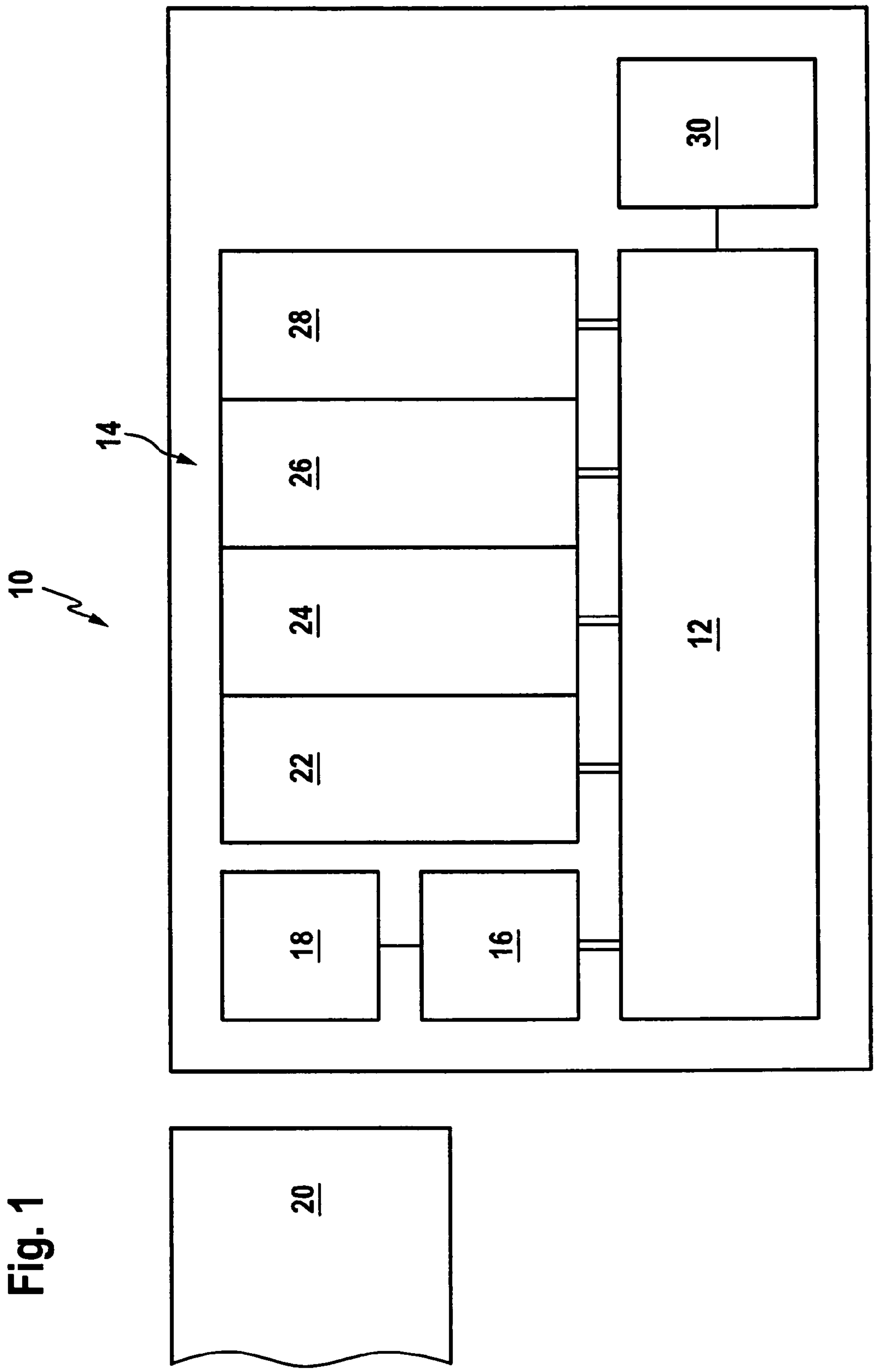
FIG. 1 shows a schematic block diagram of a first exemplary embodiment of an information carrier unit according to the invention.

An exemplary embodiment of an information carrier unit to be used according to the invention and represented in FIG. 1 comprises a processor 12, to which a memory designated as a whole by 14 is linked, the memory preferably being formed as an EEPROM.

Also connected to the processor 12 is an analog part 16, which interacts with an antenna unit 18.

When there is electromagnetic coupling of the antenna unit 18 to a read device designated as a whole by 20, the analog part 16 is then capable on the one hand of generating, with the required power, the electrical operating voltage that is necessary for the operation of the processor 12 and the memory 14, as well as the analog part 16 itself, and on the other hand of making available to the processor 12, the information signals transmitted by electromagnetic field coupling at a carrier frequency or transmitting information signals generated by the processor 12 by way of the antenna unit 18 to the read device 20.

A very wide variety of carrier frequency ranges are possible thereby.

In an LF range of approximately 125 to approximately 135 kHz, the antenna unit 18 acts substantially as a second coil of a transformer formed by the antenna unit 18 and the read device 20, energy and information transmission taking place substantially by way of the magnetic field.

In this frequency range, the range between the read device 20 and the antenna unit 18 is low, that is to say that the read device 20 must be brought up very close to the antenna unit 18, to within less than 10 cm.

In an HF range between approximately 13 and approximately 14 MHz, the antenna unit 18 likewise acts substantially as a coil, good energy transmission with a sufficiently great range being possible as before in the interaction between the antenna unit 18 and the read device 20, the distance being, for example, less than 20 cm.

In the UHF range, the antenna unit 18 is formed as a dipole antenna, so that, when the power supply to the information carrier unit 10 does not take place by way of the mobile read device 20, a great range in the communication with the read device 20 can be realized, for example up to 3 m, the interaction between the read device 20 and the antenna unit 18 taking place by way of electromagnetic fields. The carrier frequencies are from approximately 850 to approximately 950 MHz or from approximately 2 to approximately 3 GHz or from approximately 5 to approximately 6 GHz. When the power is supplied by the mobile read device 20, the communication range is up to 20 cm.

Depending on the frequency range, therefore, the antenna units 18 are also differently formed. In the LF range, the antenna unit 18 is formed as a compact coil with an extent which may be less than one square centimeter.

In the HF range, the antenna unit 18 is likewise formed as a coil, which may, however, have a greater extent of the order of several square centimeters.

In the UHF range, the antenna unit 18 is formed as a dipole antenna of diverse configuration.

The memory 14 interacting with the processor 12 is preferably divided into a number of memory areas 22 to 28, which can be written to in various ways.

For example, the memory area 22 is provided as a memory area which can be written to by the manufacturer and, for example, carries an identification code for the information carrier unit 10. This identification code is written in the memory area 22 by the manufacturer, and the memory area 22 is subsequently write-protected.

The memory area 24 can, for example, be provided with write protection which can be activated by the cable manufacturer, so that the cable manufacturer has the possibility of writing to the memory area 24 and subsequently securing the information in the memory area 24 by write protection. In this way, the processor 12 has the possibility of reading and outputting the information present in the memory area 24, but the information in the memory area 24 can no longer be overwritten by third parties.

For example, the information stored in the memory area 24 may be information concerning the kind or type of cable and/or technical specifications of the cable.

In the memory area 26, information is stored, for example by the purchaser of the cable and subsequently write-protected. Here there is the possibility for the purchaser and user of the cable to store information concerning the installation and use of the cable and secure it by write protection.

In the memory area 28, information can be freely written and freely read, so that this memory area can be used for storing and reading information during the use of the information carrier unit in conjunction with a cable.

The exemplary embodiment of the information carrier unit 10 represented in FIG. 1 is a so-called passive information carrier unit, and consequently does not require an energy store, in particular an accumulator or battery, in order to interact and exchange information with the read device 20.

A sensor 12 is also associated with the processor 12, enabling the processor 12 to pick up physical state variables of the cable, such as for example radiation, pressure, temperature, tension, elongation or moisture, and for example to store corresponding values in the memory area 28.

The sensor 30 may in this case be formed in accordance with the field of use.

For example, it is conceivable to form the sensor 30, for measuring a pressure, as a pressure-sensitive layer, it being possible for the pressure sensitivity to take place for example by way of a resistance measurement or, in the case of multiple layers, a capacitive measurement.

As an alternative to this, it is, for example, conceivable, for forming the sensor as a temperature sensor, to form the sensor as a resistor that is variable with the temperature, so that a temperature measurement is possible by a resistance measurement.

If the sensor is formed as a tension or elongation sensor, the sensor is formed, for example, as a strain gage, which changes its electrical resistance in accordance with the elongation.

If, however, the sensor is formed as a sensor reacting irreversibly to a specific elongation or to a specific, tension, it is likewise possible to form the sensor as a sensor breaking an electrical connection, for example as a wire or conductor track for which the electrical connection is interrupted as from a specific tension of a specific elongation, by rupturing at a predetermined breaking point or by tearing, or goes over from a low resistance to a high resistance.

If appropriate, however, the tension measurement or the elongation measurement could also be realized by a capacitive measurement. In the case of a moisture sensor, the sensor is preferably formed as a multilayer structure which changes its electrical resistance or its capacitance in accordance with moisture.

The sensor 30 is active whenever the information carrier unit 10 is activated by the read device 20, so that sufficient power is available also to operate the sensor 30.

During the activation of the information carrier unit 10, the sensor 30 is consequently capable of transmitting measured values to the processor 12, which then stores these measured values for example in the memory area 28 and reads them out whenever they are requested by the read device 20.

Figure 2:
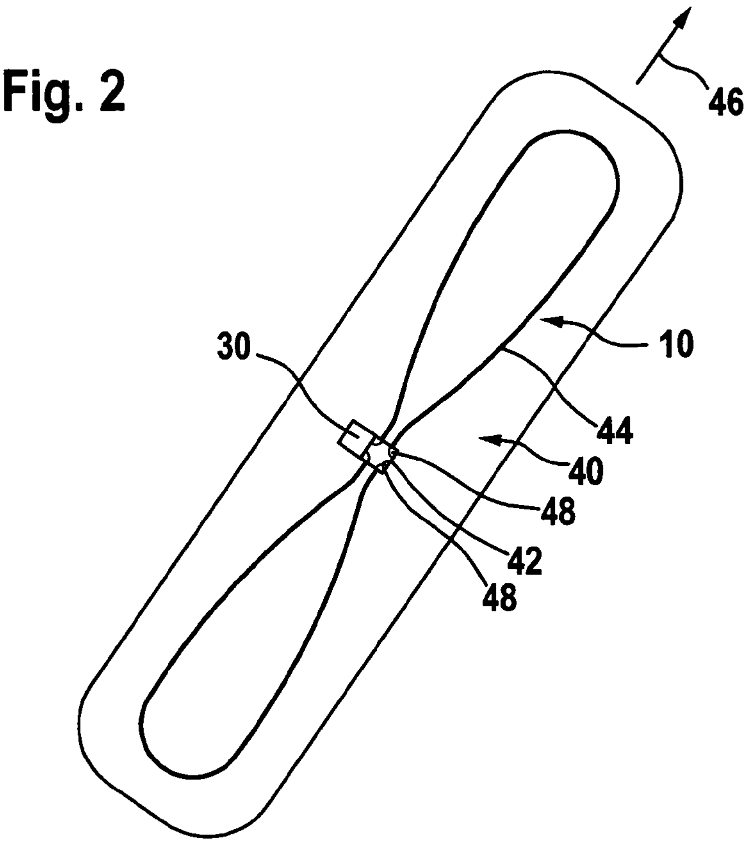
FIG. 2 shows a representation of how the first exemplary embodiment of the information carrier unit according to the invention is realized.

A way of realizing the first exemplary embodiment of the information carrier unit 10 according to the invention that is represented in FIG. 2 comprises a base 40, disposed on which is an integrated circuit 42, which has the processor 12, the memory 14 and the analog part 16, as well as conductor tracks 44, on the base 40, which form the antenna unit 18. The conductor tracks 44 may in this case be applied to the base 70 by means of any desired form-selective coating processes, for example in the form of printing-on a conductive lacquer or a conductive paste or else in the form of a wire loop.

Also disposed on the base 40 is the sensor 30, which in the case of this exemplary embodiment is, for example, a temperature sensor, so that the sensor 30 may likewise be disposed either directly next to the integrated circuit 42 or be part of the integrated circuit 42.

If the information carrier unit 10 is of a great extent in a first direction 46, the base 40 is for example produced from a flexible material, in particular a pliant material, for example a plastics strip, to which on the one hand the conductor track 44 can be easily and permanently applied by coating and on the other hand the integrated circuit 42 can also be easily fixed, in particular in such a way that a lasting electrical connection can be realized between external connecting points 48 of the integrated circuit 42 and the conductor tracks 44.

Figure 3:
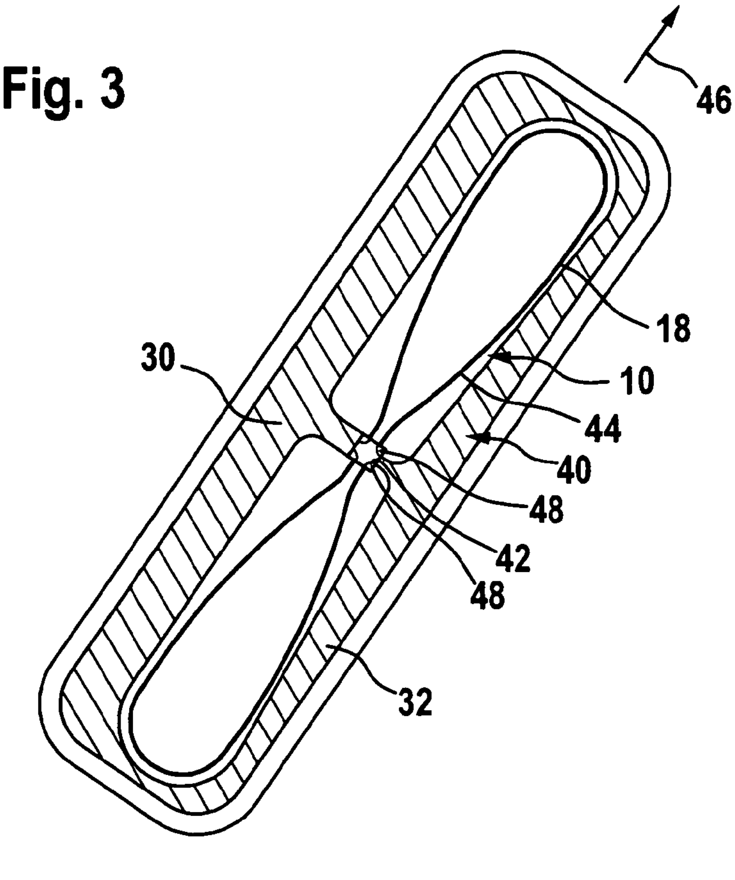
FIG. 3 shows a representation similar to FIG. 2 of a first variant of the first exemplary embodiment of the information carrier unit according to the invention.

As an alternative to the temperature sensor, the sensor of the first exemplary embodiment may, however, also be in the case of a first variant of the first exemplary embodiment, a tension or elongation sensor or a moisture sensor, which is formed over a large area as a layer 32 and is disposed on the base 40 next to the antenna unit 18, as represented in FIG. 3.

Figure 4:
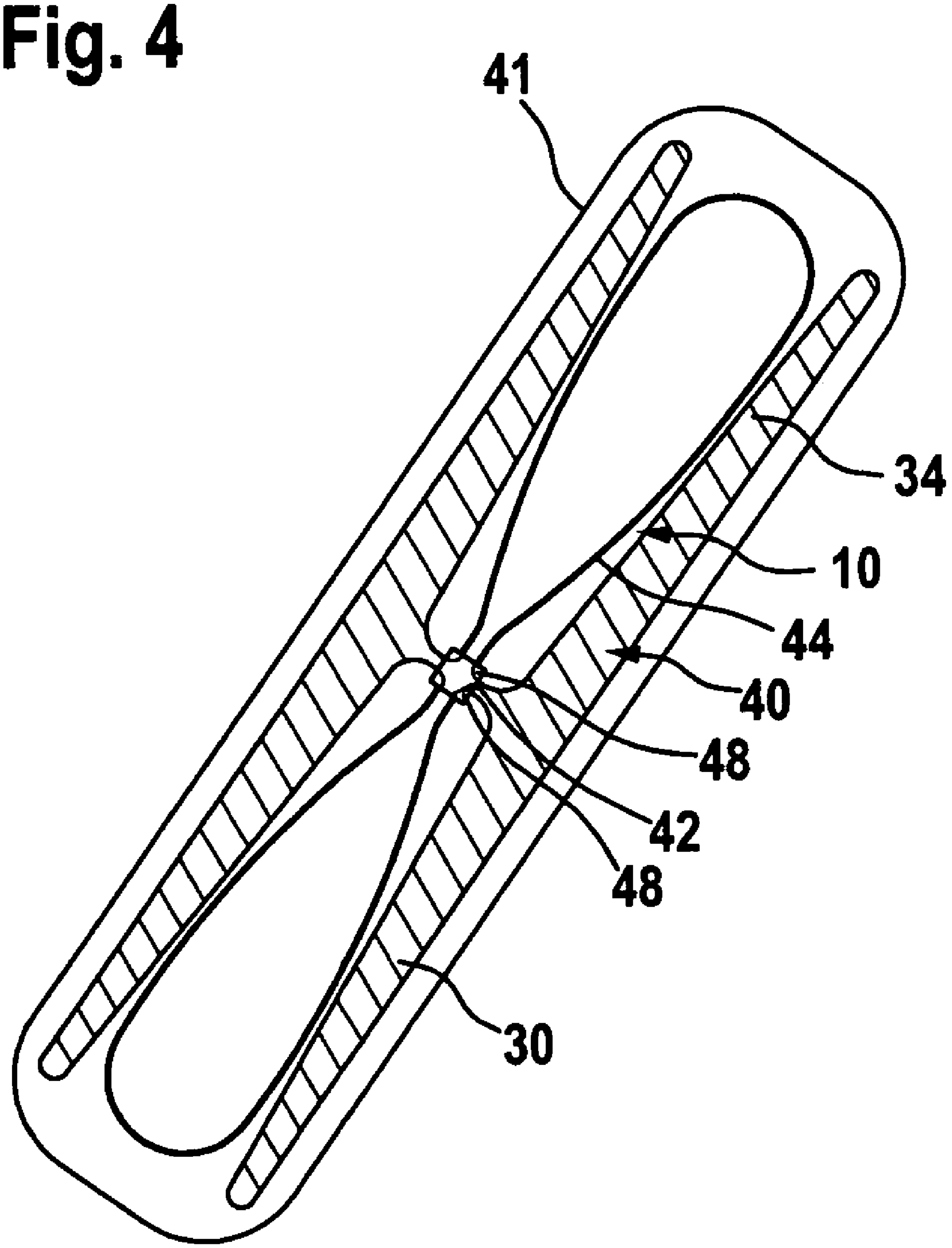
FIG. 4 shows a representation similar to FIG. 2 of a second variant of the first exemplary embodiment of the information carrier unit, according to the invention.

In the case of a second variant of the first exemplary embodiment that is represented in FIG. 4, the sensor is formed as a multilayer structure 34 and can consequently be operated with a space-saving construction as a capacitive sensor 30. In this case, moisture, temperature or pressure, in particular, can be easily picked up on the basis of the state-dependent capacitance.

Such a sensor 30 can be easily contacted by the integrated circuit or be formed as part of the same.

If the base 40 is formed as flat material, it is of advantage if it is formed with edge regions 41 with a blunt effect on their surroundings, in order to avoid damage to the surroundings of the base 40 in the cable during movement of the cable. This means in the case of a base formed from a thin flat material that it has, for example, rounded corner regions and, if possible, also edges with a blunt effect, for example deburred edges.

Figure 5:
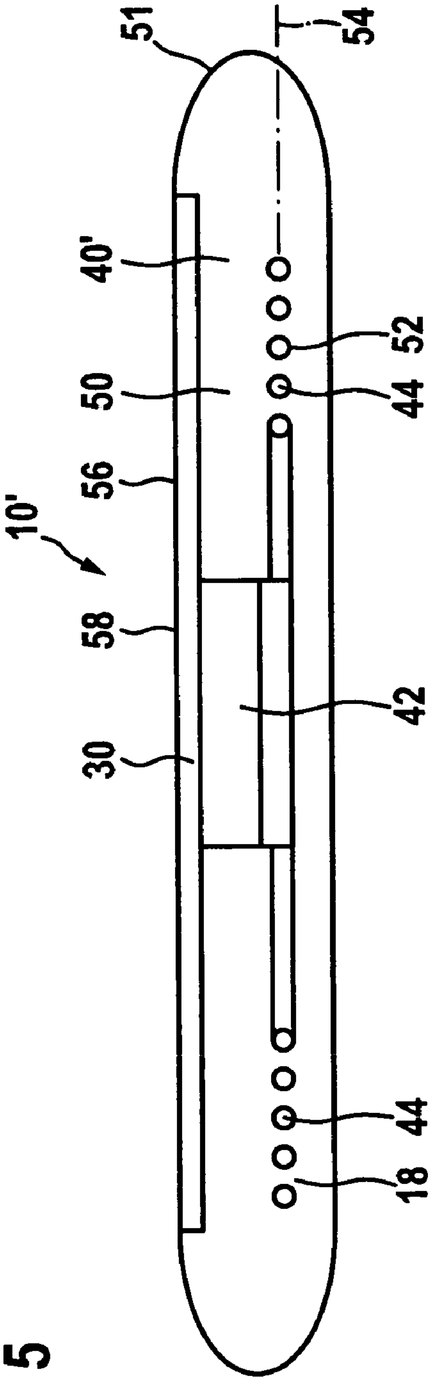
FIG. 5 shows a sectional representation of the way in which the second exemplary embodiment of the information carrier unit according to the invention is realized.

In the case of a second exemplary embodiment, represented in FIG. 5, the information carrier unit 10' is formed as a disc-shaped rigid body.

The base 40' is in this case formed by an embedding compound forming an embedding body 50, for example of resin or plastics material, in which the integrated circuit 42 and the conductor tracks 44, which form the antenna unit 18, are embedded, the conductor tracks 44 forming annular coil windings 52, for example, which lie in a plane 54 and are completely embedded in the embedding body 50.

Consequently, the antenna unit is intended for example for the HF range, in which the antenna unit 18 operates in a way similar to a second coil of a transformer.

Also disposed on a side of the integrated circuit that is facing away from the coil windings 52 is the sensor 30, which is disposed for example on a side 56 of the entry body 50 and a sensor surface 58 of which is either flush with said side 56 or protrudes beyond said side 56, so that the sensor surface 58 can be exposed to the direct effect of the physical state variable to be measured.

The sensor 30 is preferably disposed on a side opposite from the coil windings 52 of the antenna unit 18.

Also in the case of this second exemplary embodiment, the sensor 30 may be formed as a temperature sensor. It is, however, conceivable to form the sensor 30 as a pressure sensor or moisture sensor.

The embedding body 50 is provided with edge regions 51 with a blunt effect on their surroundings, which cannot cause any damage to the cable, even during bending of the cable, because of their rounding, a lenticular cross-sectional shape being formed.

Figure 6:
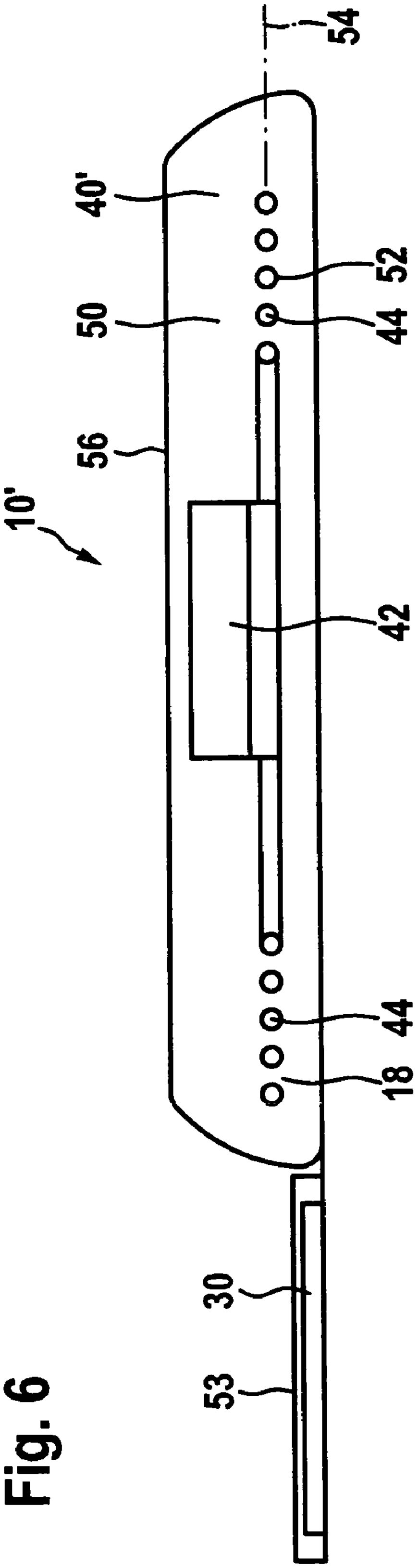
FIG. 6 shows a representation similar to FIG. 5 of a variant of the second exemplary embodiment.

In the case of a variant of the second exemplary embodiment, represented in FIG. 6, the sensor 30' is disposed alongside to the semi-lenticular embedding body 50 and extends away from it, for example in the form of a vane 53. In this case, the sensor 30' is preferably an elongation sensor, which is capable for example of measuring an elongation of the surroundings as a result of a fixed connection to its surroundings.

In the case of a second exemplary moment, those parts that are identical to those of the first exemplary embodiment are provided with the same reference numerals, so that reference can be made to the statements made with respect to the first exemplary embodiment in their entirety.

Figure 7:
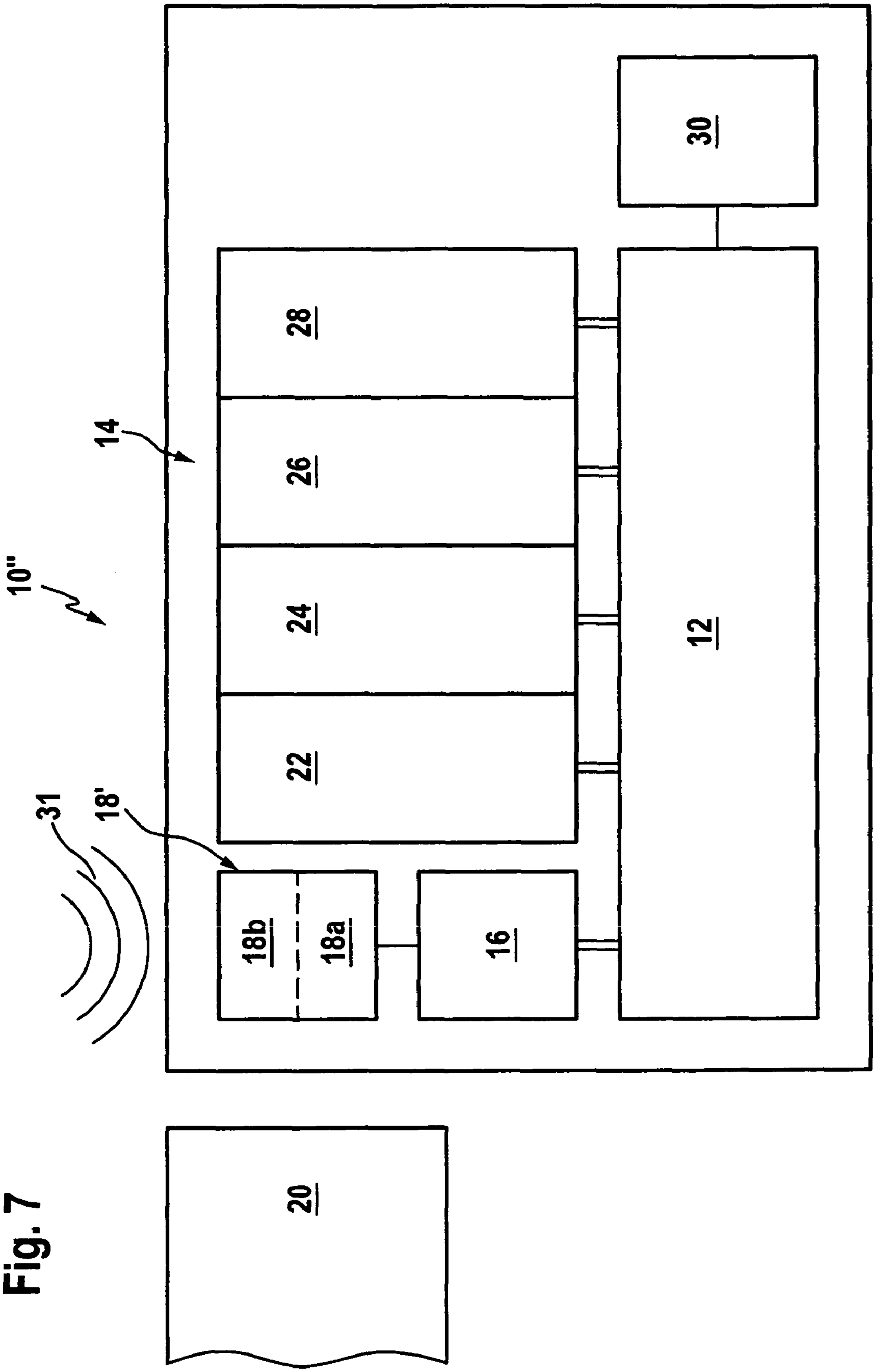
FIG. 7 shows a schematic block diagram of a third exemplary embodiment of an information carrier unit according to the invention.

By contrast with the previous exemplary embodiments, in the case of a third exemplary embodiment of an information carrier unit 10" according to the invention, represented in FIG. 7, an antenna unit 18' is associated with the analog part 16, the antenna unit having a two-part effect, to be specific for example an antenna part 18*a*, which communicates in a known way with the read device 20, and an antenna part 18*b*, which is capable of coupling to an alternating magnetic field 31 and drawing energy from it, in order to operate the information carrier unit 10 independently of the read device 20 with this energy drawn from the alternating magnetic field 31.

For example, the alternating electromagnetic field 31 can be produced by the leakage field of a data line, a control line, a pulsed current line or an alternating current line which is connected, for example, to an AC voltage source with 50 Hz or a higher frequency. It is in this way possible to supply the information carrier unit 10" with energy as long as the alternating field 31 exists, irrespective of whether the read device 20 is intended to be used for writing or reading information.

The frequency of the alternating field 31 and a resonant frequency of the antenna part 18*b* can be made to match each other in such a way that the antenna part 18*b* is operated in resonance, and consequently allows optimum coupling-in of energy from the alternating field 31.

Supplying the information carrier unit 10 with electrical energy in such a way, independently of the read device 20, is useful in particular if the sensor is intended to be used over relatively long time periods for picking up a physical state variable which is not intended to coincide with the time period during which the read device 20 is coupled to the antenna unit 18*a* but to be independent of it.

Consequently, for example, the information carrier unit 10" can be activated by switching on the alternating electromagnetic field 31, so that physical state variables can be measured by the sensor 30 and picked up by way of the processor 12, and for example stored in the memory area 28, independently of the question of whether or not the read device 20 is coupled with the antenna unit 18.

With an information carrier unit 10" of this kind, there is the possibility of carrying out measurements with the sensor 30 over long time periods, so that also a large number of measured values arise, which leads to a large amount of data if all the measured values are stored.

For this reason, a selection of the measured values is made by the processor 12 on the basis of at least one selection criterion in order to reduce the amount of data in the memory area 28.

One selection criterion is, for example, a threshold value which specifies that a measured value is stored if it is exceeded, so that in this way the amount of data is drastically reduced.

Another selection criterion may also be a statistical distribution, so that only measured values which deviate significantly from a previously determined statistical distribution are stored, and consequently the amount of data is also reduced as a result.

Figure 8:
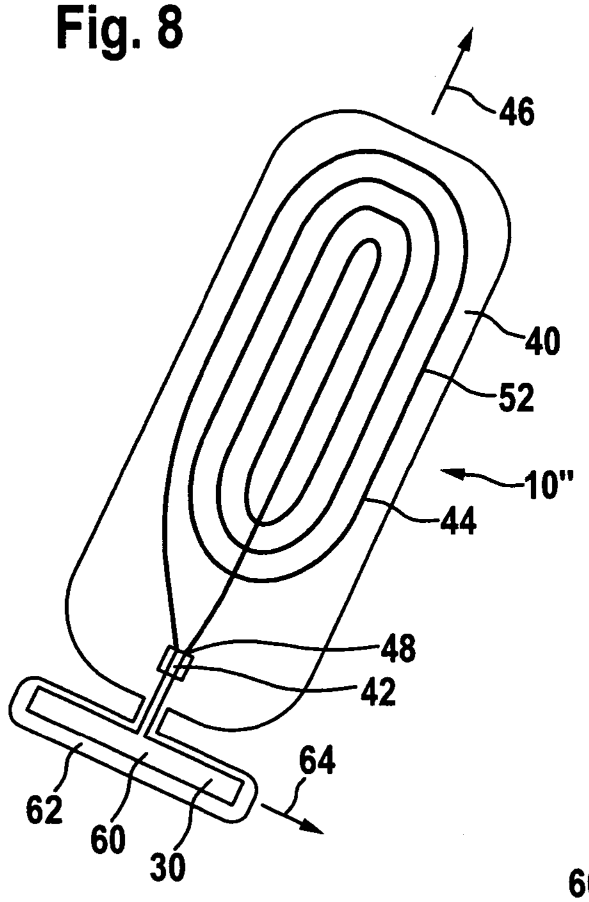
FIG. 8 shows a plan view of the third exemplary embodiment according to FIG. 7.

A way of realizing the third exemplary embodiment of the information carrier unit 10" that is represented in FIG. 8, comprises a base 40, which is formed in the same way as in the case of the first exemplary embodiment.

Also disposed on the base 40 are the integrated circuit 42 and the conductor tracks 44, which in the case of this exemplary embodiment, form coil windings 52.

In the case of this exemplary embodiment, however, the sensor 30 is formed as a strain gage 60, which in the case of this exemplary embodiment is disposed on a substrate 62 that is connected to the base 40 and can be elongated in a longitudinal direction 64 of the strain gage 60.

In the case of this exemplary embodiment, the substrate 62 together with the strain gage 60 can be advantageously fixed on the part to be measured or embedded in it, so that the elongation of this part or of the surroundings of the substrate 62 is transmitted to the substrate 62, and consequently the substrate 62 can pick up the elongation of its surroundings and transmit it to the strain gage 60 without distortion.

In the case of this exemplary embodiment, the longitudinal direction 64 runs, for example, transversely to the direction 46, which represents a longitudinal direction of the base 40.

Consequently, provided that the strain gage 60 is fixedly connected to a component part of the cable that can undergo elongation, in the case of this information carrier unit 10'', it is possible for elongations in the longitudinal direction 64 of the strain gage to be measured and to be picked up by the processor 12 on the integrated circuit 42.

Figure 9:
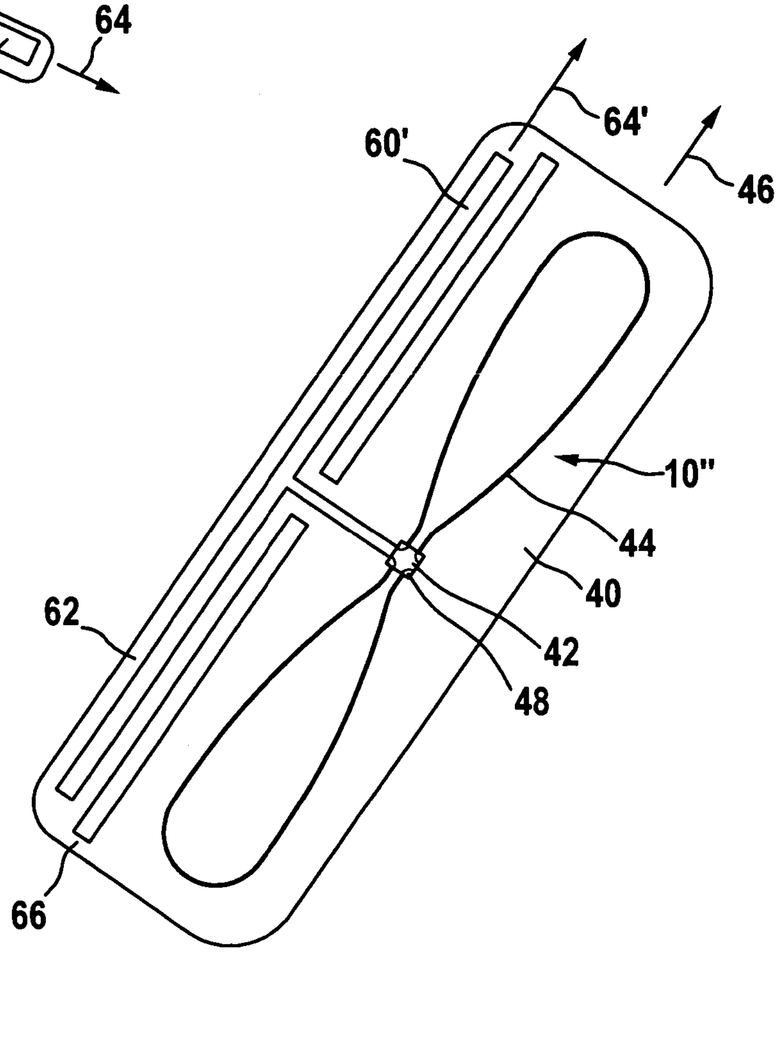
FIG. 9 shows a plan view similar to FIG. 8 of a variant of the third exemplary embodiment.

In the case of a variant of the third exemplary embodiment, represented in FIG. 9, the information carrier unit 10' is constructed in the same way as in the case of the third exemplary embodiment, but with the difference that the strain gage 60' extends with its longitudinal direction 64' parallel to the direction 46, and thereby lies to the side of the conductor tracks 44 for the antenna unit 18. The strain gage 60' is for its part likewise disposed on the substrate 62, which can undergo elongation in the longitudinal direction 64 with the strain gages 60' and is therefore connected to the base 40, for example by way of webs 66, so that the substrate 62 has the possibility of undergoing elongation parallel to the direction 46, with the strain gage 60' substantially unhindered by the base 40.

With regard to the parts of the third exemplary embodiment that are identical to those of the first and second exemplary embodiments, the same reference numerals as in the case of the previous exemplary embodiments have been used, so that, with regard to the description of the same, reference can be made to the previous exemplary embodiments in their entirety.

An information carrier unit corresponding to the exemplary embodiments described above can be used according to the invention in different variants for a cable.

Figure 10:
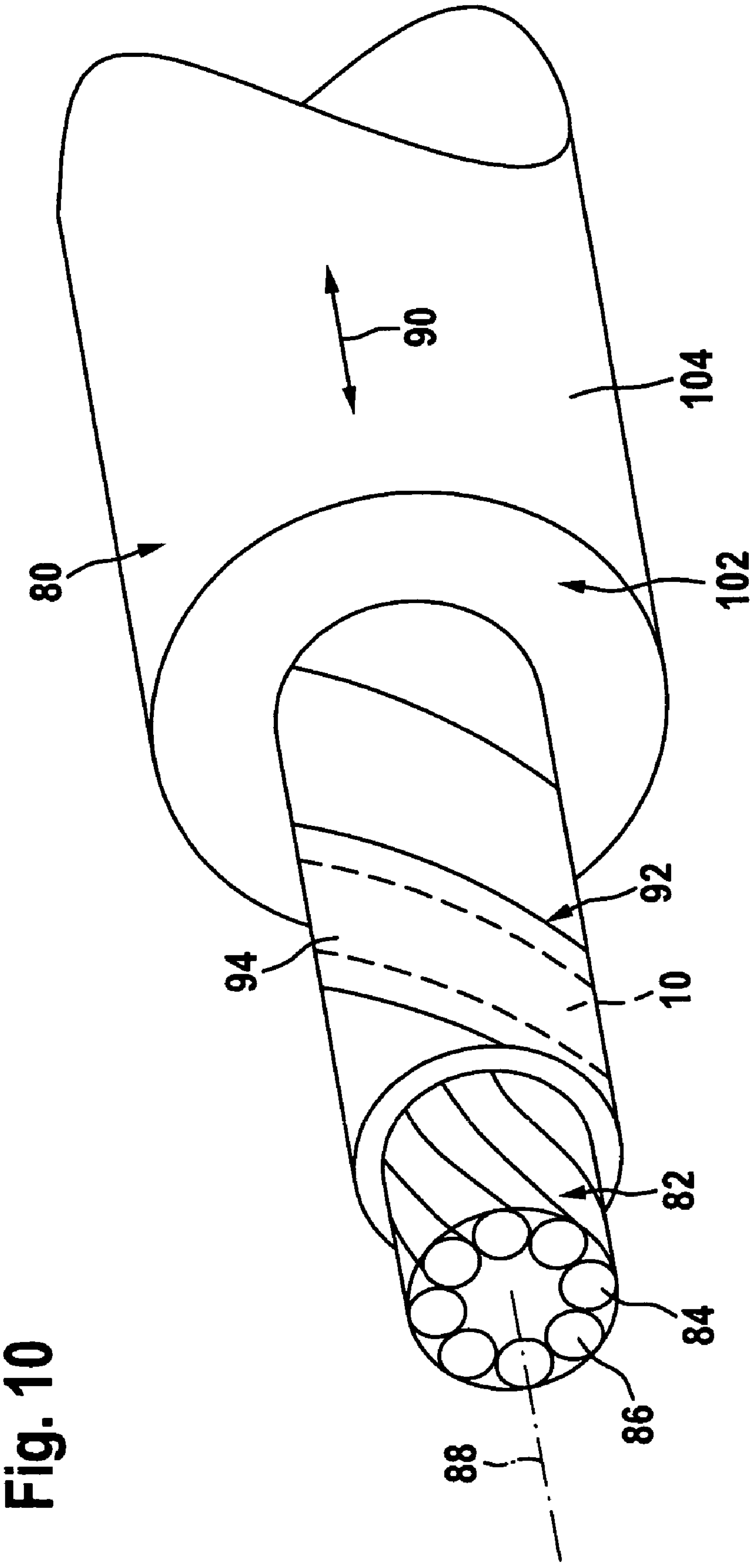
FIG. 10 shows a perspective representation of a first exemplary embodiment of a cable according to the invention.

A first exemplary embodiment of a cable 80 according to the invention, represented in FIG. 10, comprises an inner cable body 82, in which a number of electrical conductor strands 84 run, the electrical conductor strands 84 respectively comprising, for example, a core 86 of an electrical conductor, which is insulated.

In this case, the electrical conductor strands 84 are preferably twisted with one another about a longitudinal axis 88, that is to say they lie disposed about the longitudinal axis 88 and run at an angle to a parallel to the longitudinal axis 88 that intersects the respective conductor strand 84.

The inner cable body 82 is enclosed over its entire extent in a longitudinal direction 90 of the cable 80 by a separating layer 92, which separates the inner cable body 82 from a cable sheath 102 that encloses the inner cable body 82 and forms an outer surface 104 of the cable.

In the case of the exemplary embodiment represented in FIG. 10, the separating layer 92 is formed by a strip 94, which is wound around the inner cable body 82, to be precise with a pitch which deviates from that of the twisted conductor strands 84, for example is greater than the pitch of the conductor strands 84.

Figure 11:
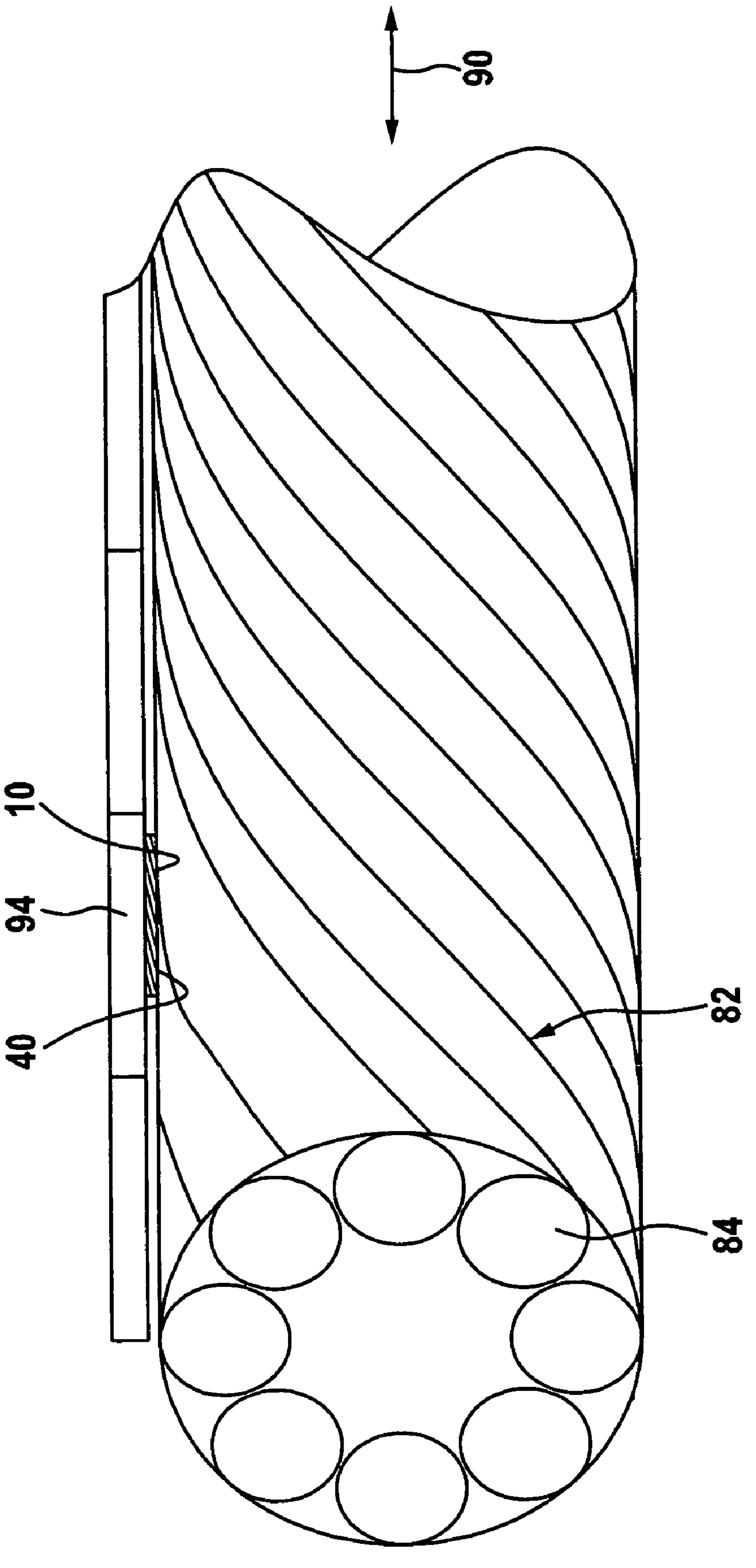
FIG. 11 shows a sectional representation through the first exemplary embodiment of the cable according to the invention in the region of the inner cable body and the separating layer.

The strip 94 is, for example, a nonwoven strip, which, during the production of the cable 80, is wound around the inner cable body 82 before the extrusion of the cable sheath 102 and, as represented in FIG. 11, carries on its side facing the inner cable body 82, the information carrier unit 10, which is disposed on a base 40.

In the case of the first exemplary embodiment of the cable according to the invention, the base 40 is then disposed, as represented in FIG. 11, in such a way that it is facing the inner cable body 82, in particular the conductor strands 84, so that the integrated circuit 42 and the conductor tracks 44 are facing the strip 94, and consequently are disposed in a protected manner between the strip 94 and the base 40, in order to avoid damage to the conductor track 44 as early as during cable production, in particular in the region of the external connecting points 48.

For example, the base 40 is bonded face-to-face to the strip 94 by an adhesive, to be precise before the strip 94 is wound around the inner cable body 82, so that the information carrier unit 10 can also be introduced and integrated into the cable in a defined manner while the strip 94 is being wound around the inner cable body 82.

The fact that—as already described—the base 40 has blunt edge regions 41 means that the inner cable body 82 is not damaged during the bending of the cable 80, although the base 40 lies directly on the inner cable body 82.

If the base 40 has a sufficient thermal conductivity, in the case of the first exemplary embodiment of the information carrier unit 10 with the sensor 30 according to the first exemplary embodiment disposed on the base 40 in a way corresponding to FIG. 2 or to the variants according to FIG. 3 or FIG. 4, a temperature which corresponds to a temperature of the inner cable body 82 can be measured.

If the information carrier unit is formed according to the third exemplary embodiment 10'', the strain gage 60 according to FIG. 8 or 60' according to FIG. 9 is firmly fixed on the strip 94, in particular together with the substrate 62, the longitudinal direction 46 of the base 40 running approximately parallel to the longitudinal direction of the strip 94, so that tension or elongations transversely to the longitudinal direction of the strip 94 can be picked up with the strain gage 60 and tension or elongations in the longitudinal direction of the strip 94 can be picked up with the strain gage 60'.

The elongations of the strip 94 are then representative of the stressing of the cable 80 during the bending of the same and in the case of this exemplary embodiment can be picked up by the processor 12, stored if appropriate, and read out by means of the read device 20.

The strain gage 60 or 60' may either be made of a material which tears under tension or elongation, so that its electrical resistance irreversibly increases, for example becomes very great, when a threshold value for the tension or elongation is exceeded.

Or else the strain gage 60 or 60' may be made of a material which reversibly changes its resistance with the tension occurring or the elongation occurring.

If shear stresses in the cable 80, for example shear stresses between the cable sheath 102 and the inner cable body 82, are to be picked up by the strain gages 60 or 60', the substrate 62 is fixed, for example by adhesion, with one end on the inner cable body 82, and an upper side of the respective strain gage 60 or 60' that is facing away from the substrate 62 is fixed with the end lying opposite in the longitudinal direction 64 or 64' to the strip 94, whereby in the finished cable 80, there is an intimate bond between the strip 94 and the cable sheath 102 extruded onto it, so that the strain gages 60 or 60' can then be used to pick up relative movements between the inner cable body 82 and the cable sheath 102 with the strip 94 fixed in relation to the sheath.

Figure 12:
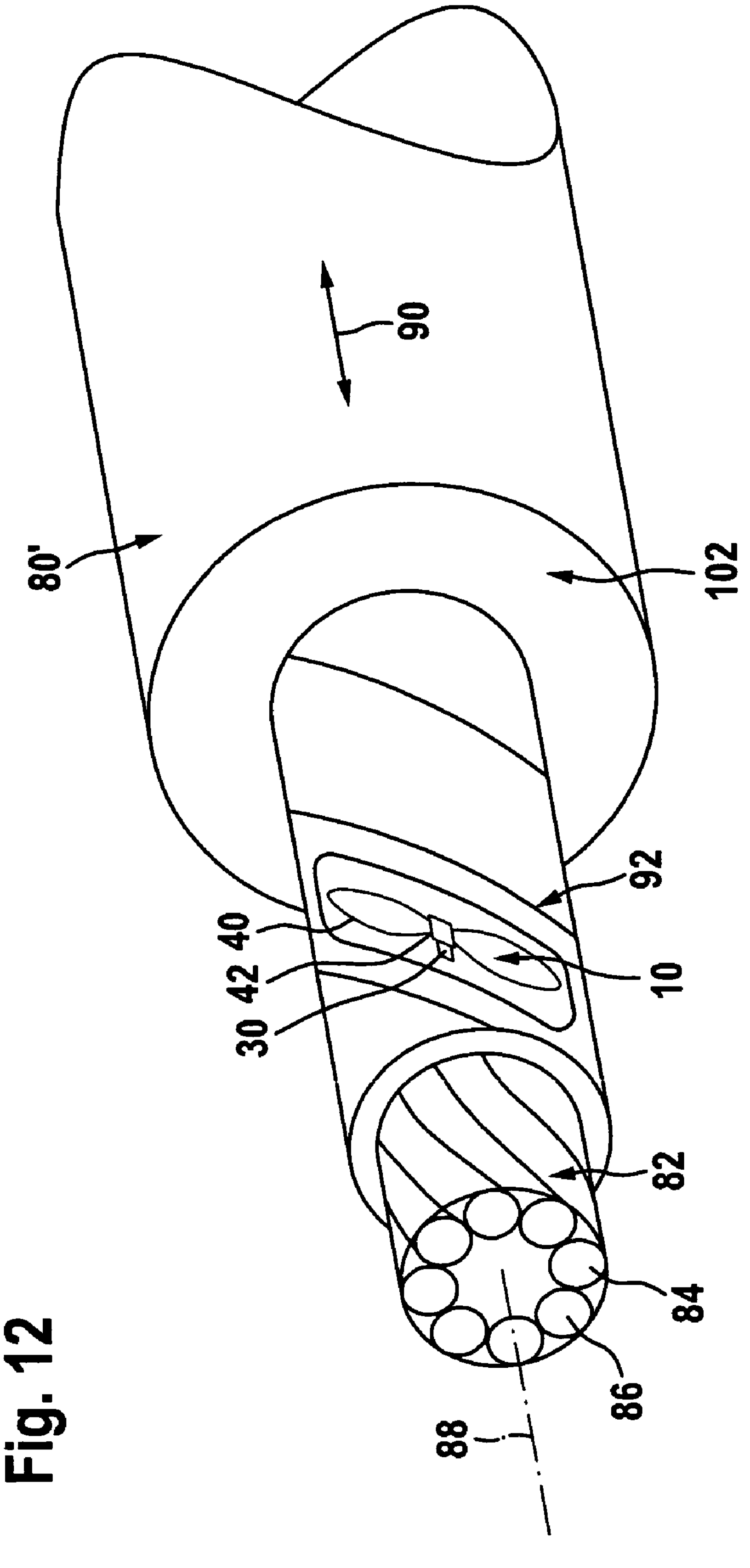
FIG. 12 shows a perspective representation similar to FIG. 10 of a second exemplary embodiment of the cable according to the invention.
Figure 13:
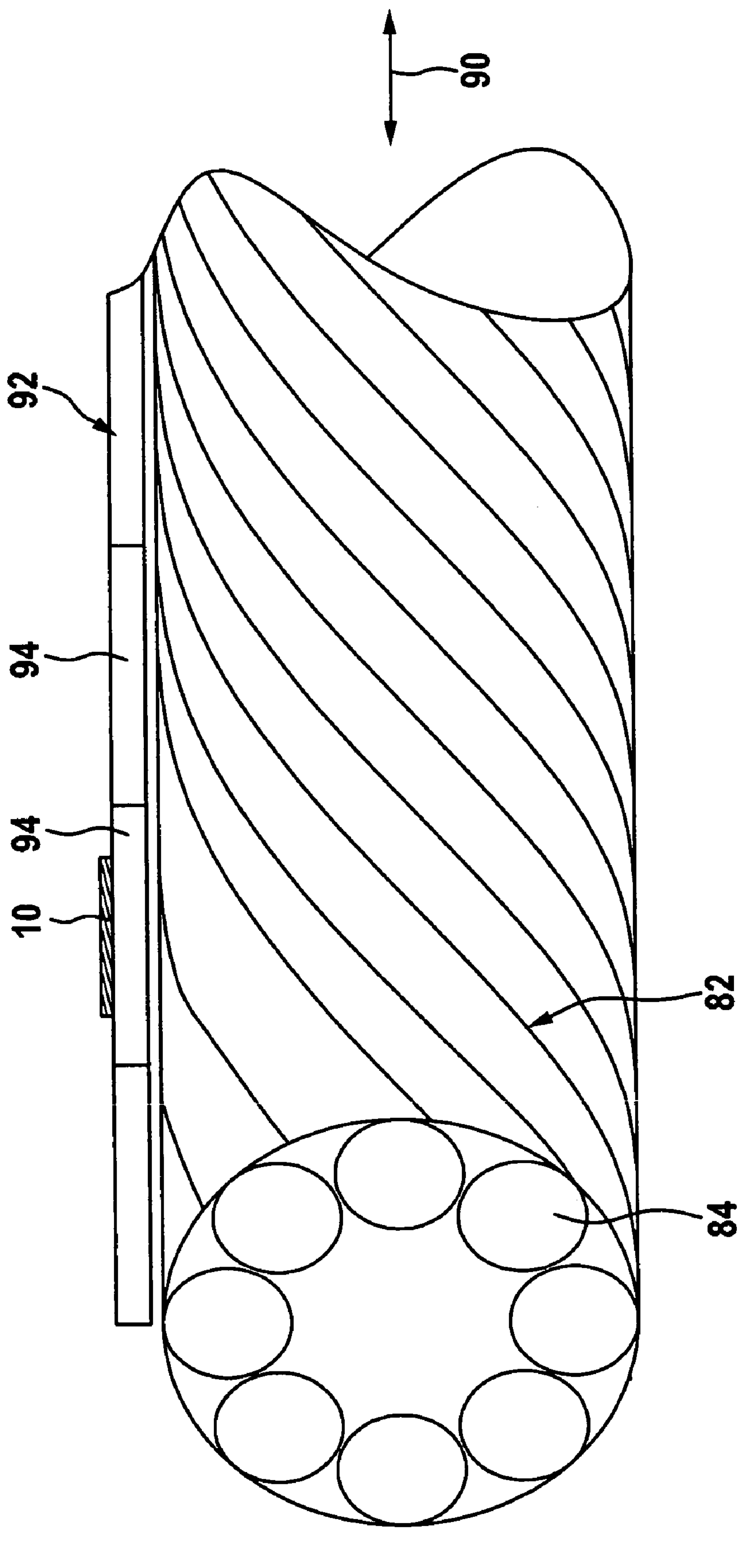
FIG. 13 shows a sectional representation similar to FIG. 11 of the second exemplary embodiment of the cable according to the invention.

In the case of a second exemplary embodiment of a cable 80' according to the invention, represented in FIGS. 12 and 13, the base 40 is disposed on a side of the strip 94 that is facing away from the inner cable body 82, to be precise in such a way that the integrated circuit 42 with the conductor tracks 44 likewise lies on a side of the strip 94 that is facing away from the carrier 40.

In this case, too, the information carrier unit 10 can be introduced into the inner cable body 82 in a defined manner while said inner cable body is being wound around during the production of the cable.

With the information carrier unit 10 according to the first exemplary embodiment, there is the possibility of early detection with the sensor 30, for example formed as a moisture sensor, of moisture penetrating through the cable sheath 102, that is possibly before the moisture reaches the inner cable body 82, so that, if the information carrier unit 10 is constantly read, cable damage can be detected before it causes damage in the inner cable body 82.

The sensor 30 may, however, also be formed as a pressure sensor, in order to pick up a pressure acting radially on the cable 80'.

In the case of an information carrier unit 10" formed according to the third exemplary embodiment, it is possible to pick up tension or elongations in the region between the cable sheath and the separating layer 92, the substrate 62 or 62' being fixed for example in the region of its ends that are disposed at a distance from one another in the longitudinal direction 64, either on the strip 94 or directly to the cable sheath 102, in order to pick up tension or elongation in the sheath.

The information carrier unit 10 according to the first or second exemplary embodiment of the cable according to the invention is formed, for example, as an information carrier unit 10 which operates in the HF range, that is to say, has an antenna unit 18, the extent of which is, for example, several square centimeters.

In the case of the second exemplary embodiment, represented in FIGS. 12 and 13, the fact that the base 40 is disposed on the side of the separating layer that is facing away from the inner cable body 82 provides the possibility of optically detecting the base 40 of the information carrier unit 10 if the cable sheath 102 is produced from a material that is transparent in the visible range.

Figure 14:
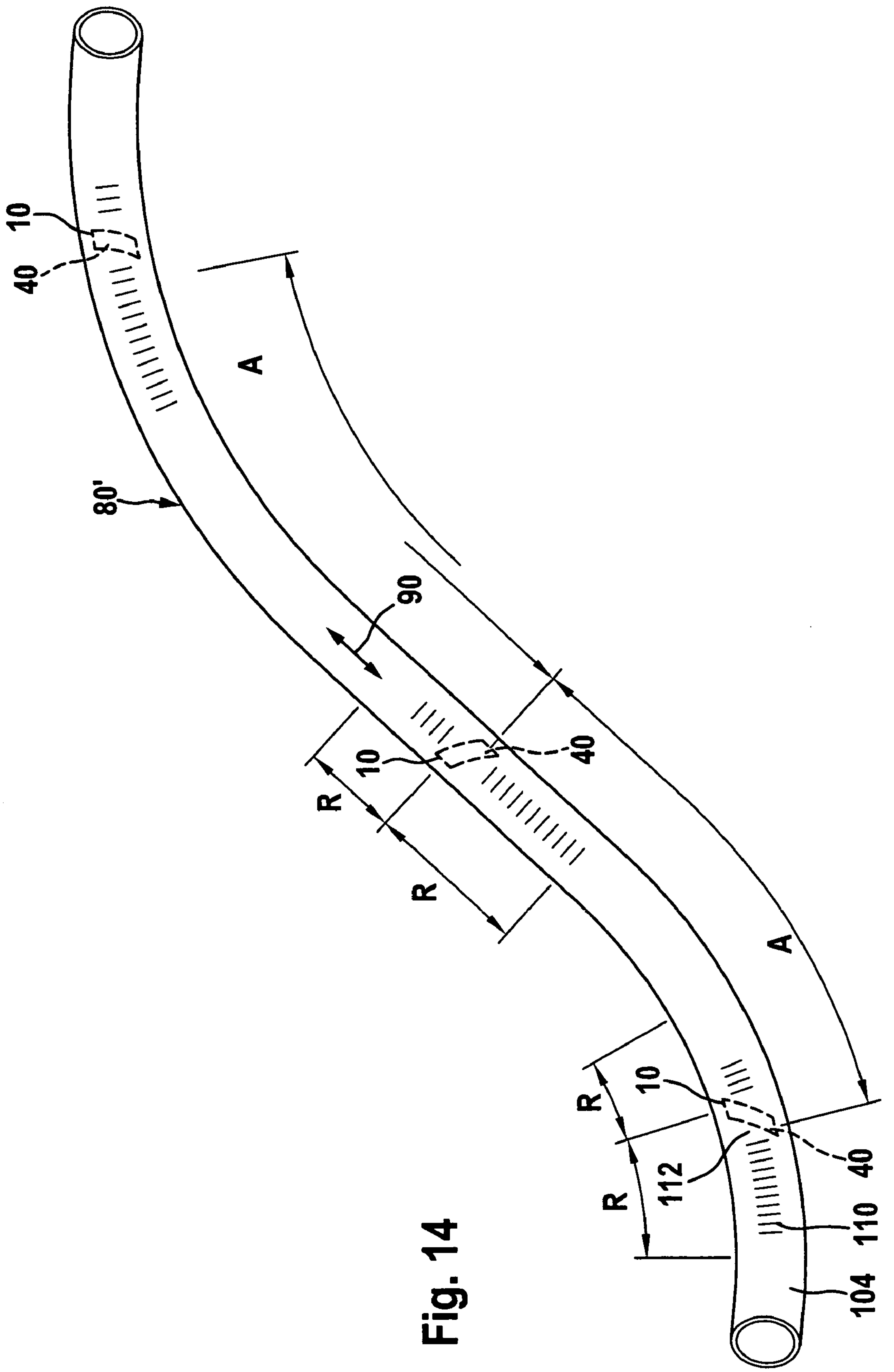
FIG. 14 shows a representation of a piece of cable of the second exemplary embodiment of the cable according to the invention.

Such a solution is represented in FIG. 14, a number of information carrier units 10 being disposed one after the other at uniform distances A in the longitudinal direction 90 of the cable 80', so that the information carrier units 10 follow one after the other at defined geometrical intervals, that is, spaced apart by the distance A, over the entire length of the cable 80'.

There is consequently the possibility, for example, of indicating a position in the longitudinal direction of the cable 80' by the information carrier units 10, so that, by reading one of the information carrier units 10, it is evident at what distance said unit is positioned from one of the ends of the cable 80'.

For this purpose, it is also possible, for example, for the user to write information concerning the position of the respective information carrier unit 10, for example the distance thereof from the two ends of the cable 80', to the memory area 26.

If, furthermore, the base 40 is produced in a color that is distinctly different from the color of the separating layer 92, it is possible, when the cable sheath 102 is of a such a configuration that it is transparent in the visible spectral range, to detect the position of the respective information carrier units 10 even from the outside and address them in a defined manner with the read device 20, in order to read out the information from the respective information carrier units 10.

In order to make it easier to find the information carrier units 10 on the cable, it is preferably provided that the cable sheath 102 carries an inscription 110 on the outer surface 104 of the cable, said inscription additionally comprising a gap 112 in the inscription, the information carrier unit 10 being disposed in the cable 80' in line with the gap 112 in the inscription.

It is consequently possible by moving the read device toward the gap 112 in the inscription to address the information carrier unit 10 with the read device 20, and read out from it, without closer inspection of the cable 80'.

Preferably, the inscription 110 with the gap 112 is associated with each position of an information carrier unit 10, in order in this way to make it easier to find the information carrier unit 10 and to be able to assign the data that can be read out with the read device 20, in particular also the measured values of the sensor 30, unambiguously to the respective point in the cable.

Even if in the case of this embodiment, the cable sheath 102 is not transparent, there is likewise the possibility of easily finding and reading the information carrier unit 10 in the cable 80', simply by moving to the gap 112 in the inscription.

In the case of this second exemplary embodiment, furthermore, a reading/writing range R of the information carrier units is chosen such that the reading/writing range R of the individual information carrier units 10 does not overlap in the longitudinal direction 90 of the cable 80, but instead there are sufficient intermediate spaces between the respective reading/writing ranges R, so that each of the information carrier units 10 can be individually addressed and read with the read device 20.

In the simplest case, the distance A between the information carrier units 10 is then at least 2 times the reading/writing range R of the information carrier units 10, still better at least 2.5 times the reading/writing range R.

Figure 15:
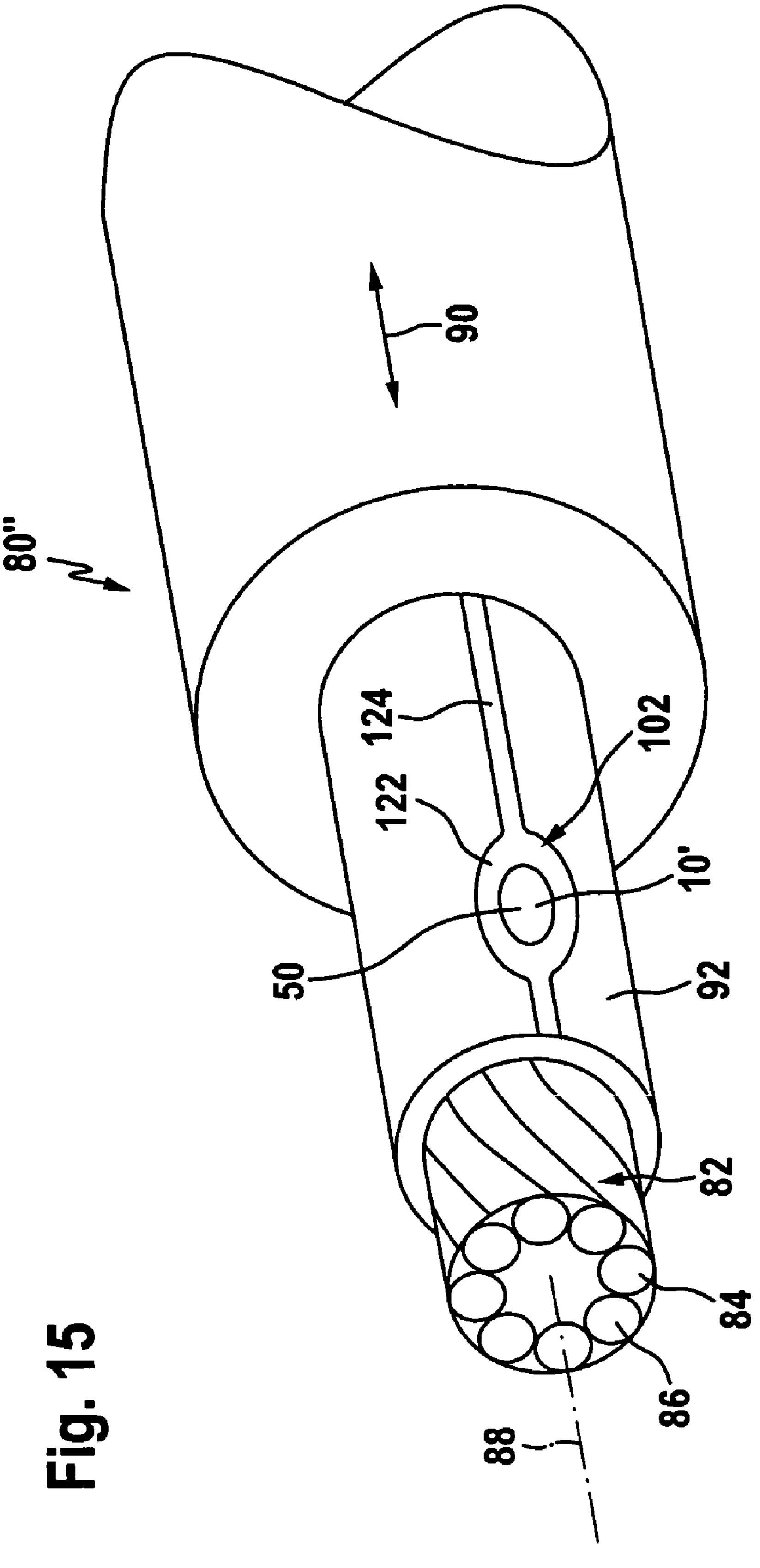
FIG. 15 shows a perspective representation of a third exemplary embodiment similar to FIG. 10 of the cable according to the invention.
Figure 16:
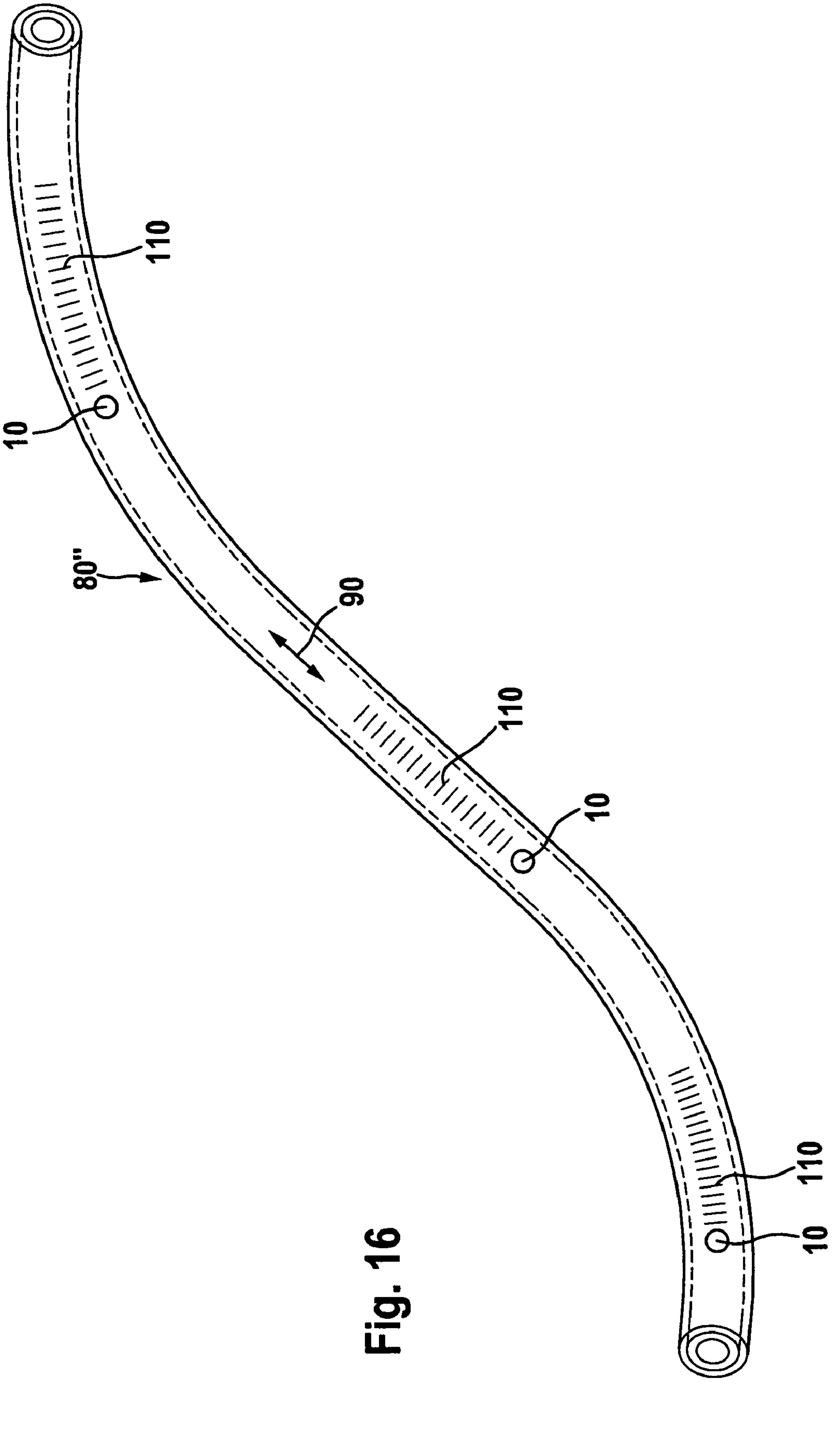
FIG. 16 shows a representation similar to FIG. 14 of the third exemplary embodiment of the cable according to the invention.

There is also the possibility, however, as represented in FIGS. 15 and 16, in the case of a third exemplary embodiment of a cable 80" according to the invention, of holding the information carrier unit 10' according to the second exemplary embodiment on a carrier strip 120, which lies on a side of the separating layer 92 that is facing away from the inner cable body 82 and extends parallel to the longitudinal direction 90 of the cable 80" over the entire length thereof, the carrier strip 120 being provided at defined intervals with one of the information carrier units 10 formed as a dish.

Consequently, the information carrier unit 10' is in this case a disk-like rigid body, which is introduced into the cable 80" during the production thereof by feeding in the carrier strip 120, and is positioned at defined intervals within the cable 80.

For receiving the base 40', the carrier strip 120 is in this case provided with enlarged regions 122, onto which the respective base 40' of the corresponding information carrier unit is adhesively attached, narrow regions of the carrier strip 120 being connected to the enlarged regions 122 and respectively extending between the enlarged regions 122.

In the case of this exemplary embodiment of the cable 80" according to the invention, the carrier strip 120 is preferably likewise placed against the separating layer 92; irrespective of the way in which the separating layer is applied to the inner cable body 82, such placement of the carrier strip 120 taking place in a way similar to attachment of a filler tape of the cable.

In the case of this exemplary embodiment of the information carrier unit 10', the sensor 30 lies on a side facing the cable sheath 102, in order for example to pick up temperature or pressure in the cable sheath 102.

If the sensor is formed according to the variant of the second exemplary, embodiment (FIG. 6), the vane 51 extending away from the embedding body 50 is in contact either with the separating layer 92 or with the cable sheath 102.

Also in the case of this exemplary embodiment, the information carrier unit 10 can be seen through the cable sheath 102 if the cable sheath 102 is formed from a material that is transparent in the visible spectral range, so that the embedding body 50 of the information carrier unit that is located on the inner cable body 82 can be seen through the cable sheath 102 if this embedding body 50 is of a distinctly different color from the separating layer 92 on which it is disposed. (FIG. 16).

If the position of the information carrier units 10 cannot be easily found to locate said units, an inscription 110 may also be additionally provided, for example with a gap 112 in the inscription.

However, it is also conceivable in the case of this exemplary embodiment, to dispose the inscription 110, for example, in such a way that the position at which the information carrier unit 10 can be found in the longitudinal direction 90 of the cable 80 is indicated by the beginning of the inscription 110 or the end of the same.

In the case of this exemplary embodiment, the sensor 30 is, for example, a pressure sensor, by which pressure conditions in the cable 80'', in particular in the cable sheath 102, can be picked up.

Figure 17:
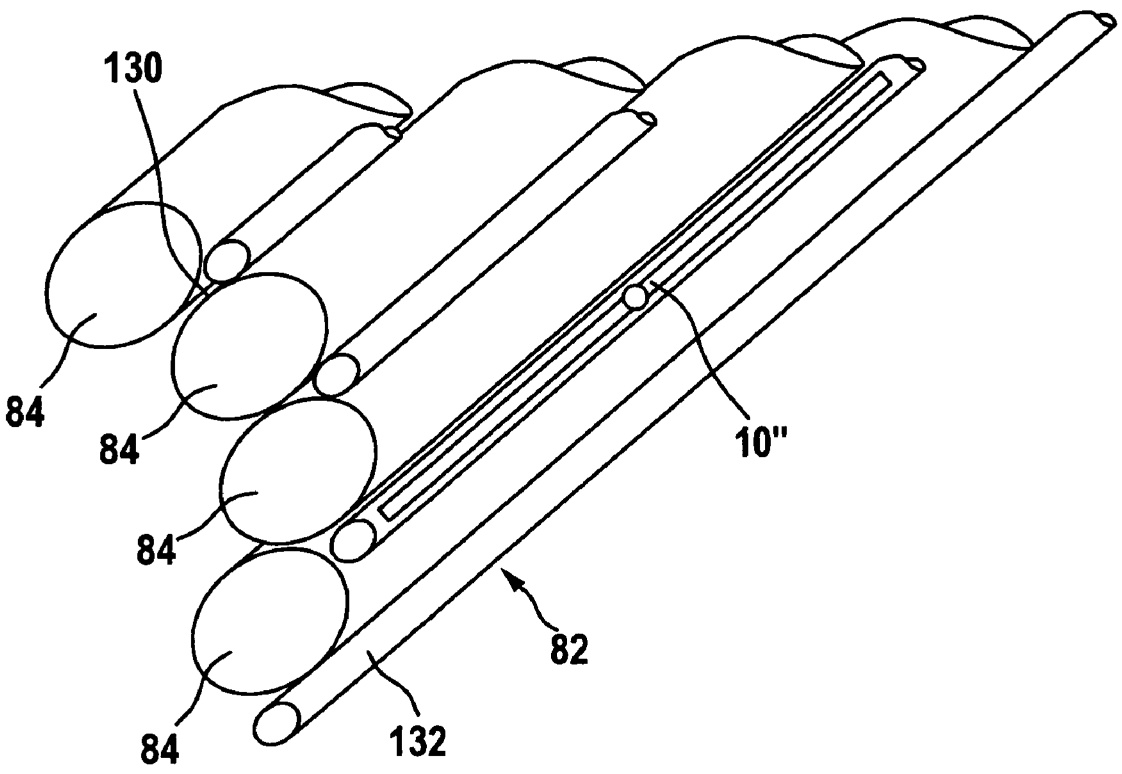
FIG. 17 shows a perspective view of a fourth exemplary embodiment of the cable according to the invention.
Figure 18:
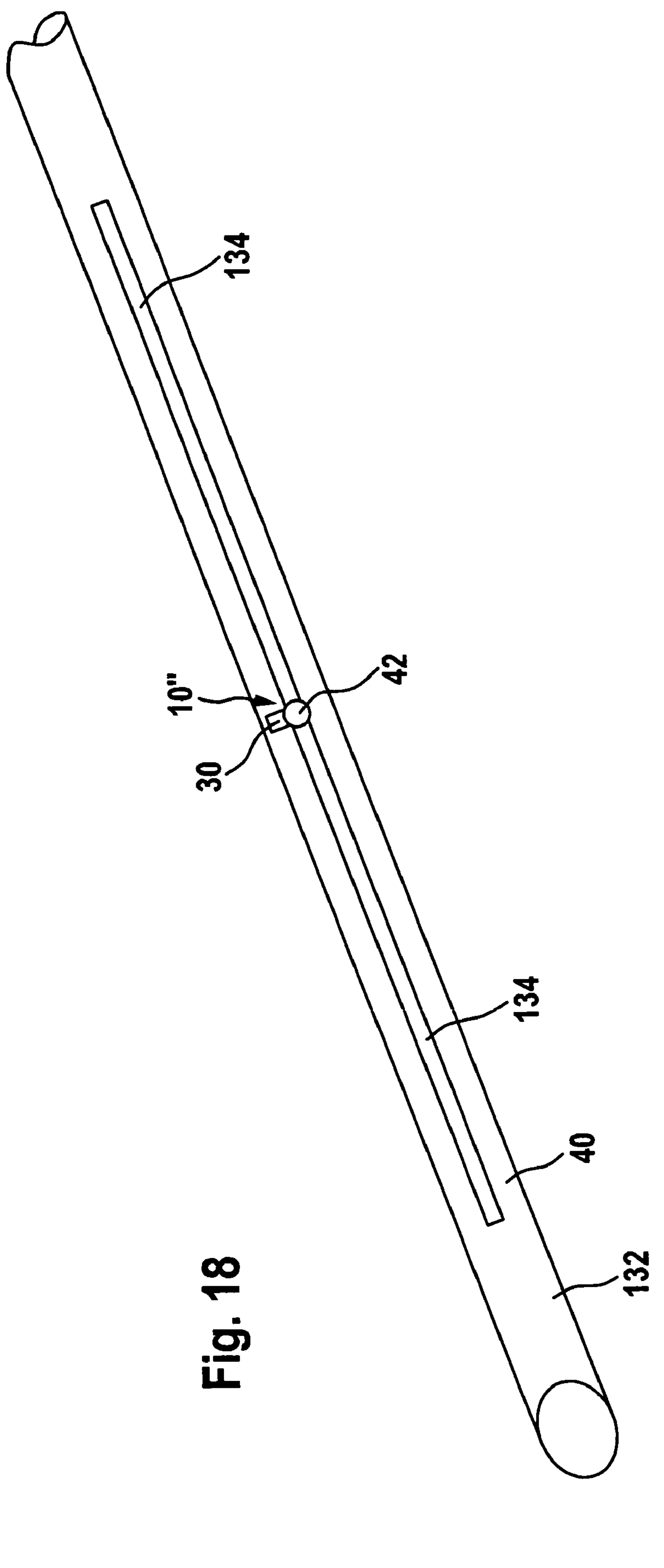
FIG. 18 shows a perspective view of an interstitial cord of the fourth exemplary embodiment of the cable according to the invention.

In the case of a fourth exemplary embodiment of a cable 80''' according to the invention, represented in FIGS. 17 and 18, interstitial cords 132 lie in the inner cable body 82, between the electrical conductor strands 84, to compensate for the interstices 130 that are present, said cords being twisted with the electrical conductor strands 84 and an information carrier unit 10 being integrated in one of the interstitial cords 132.

For example, in this case the integrated circuit 42 lies within the interstitial cord 132, and thin wires 134 extend on both sides of the integrated circuit 42, forming the antenna unit 18, which in this case is preferably formed as a dipole antenna, so that merely a single wire 134 runs on both sides of the integrated circuit 42 and, like the integrated circuit 42, said wire is likewise embedded in the interstitial cord 132 acting as a carrier.

In the case of the solution according to the invention, the interstitial cord 132 thereby forms the carrier strand in which the information carrier unit 10 according to the first exemplary embodiment is disposed and by which the information carrier unit 10 can be introduced into the cable 80''', that is simply by the interstitial cord 132 being twisted together with the electrical conductor strands 84 in a known manner to form the inner cable body 82.

Also when the information carrier unit 10 is introduced into the interstitial cord 132 there is the possibility of providing the information carrier units 10 at defined intervals A along the interstitial cord 132, a defined disposition of the information carrier units 10 being possible once again at defined intervals in the longitudinal direction 90 of the cable 80'''.

In the case of this exemplary embodiment, the information carrier unit 10 can be operated in the UHF range, since the antenna unit 18 is preferably formed as a dipole.

However, there is also the possibility of forming the antenna unit as an elongate coil, and consequently operating the information carrier unit 10 in the LF range.

If, in the case of this exemplary embodiment, the sensor 30 is formed as a temperature sensor, temperatures of the conductor strands 84 can be picked up with great accuracy, since the sensor 30 lies very close to the conductor strands 84.

However, it is also possible to form the sensor 30 as an irreversible tension or elongation sensor, which has a conductor track 44 which tears if a tension or elongation threshold is exceeded and, as a result, irreversibly increases its electrical resistance, so that an excessive tensile or elongational loading in the inner cable body 82 can be picked up.

Figure 19:
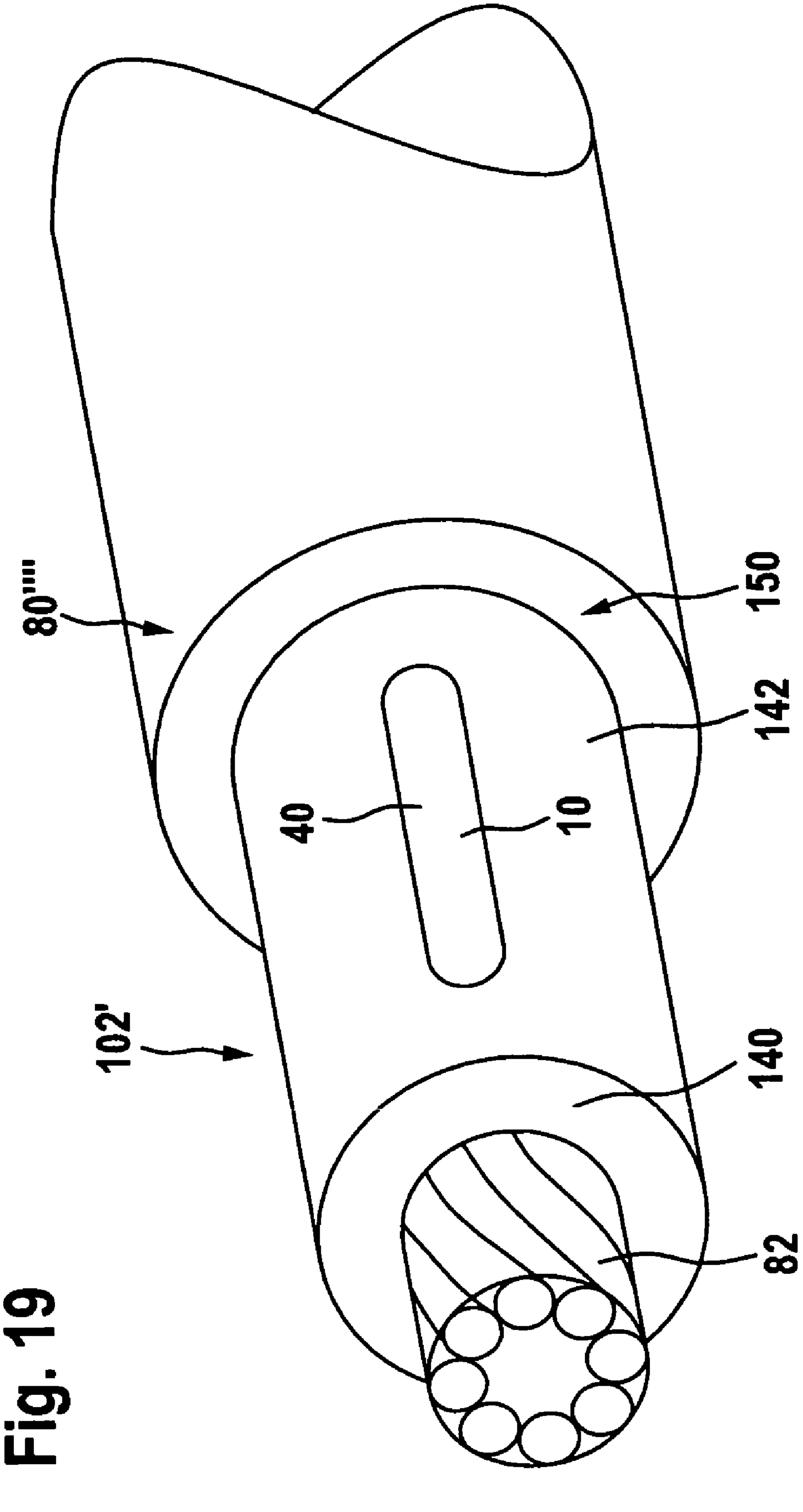
FIG. 19 shows a perspective view similar to FIG. 10 of a fifth exemplary embodiment of the cable according to the invention.
Figure 20:
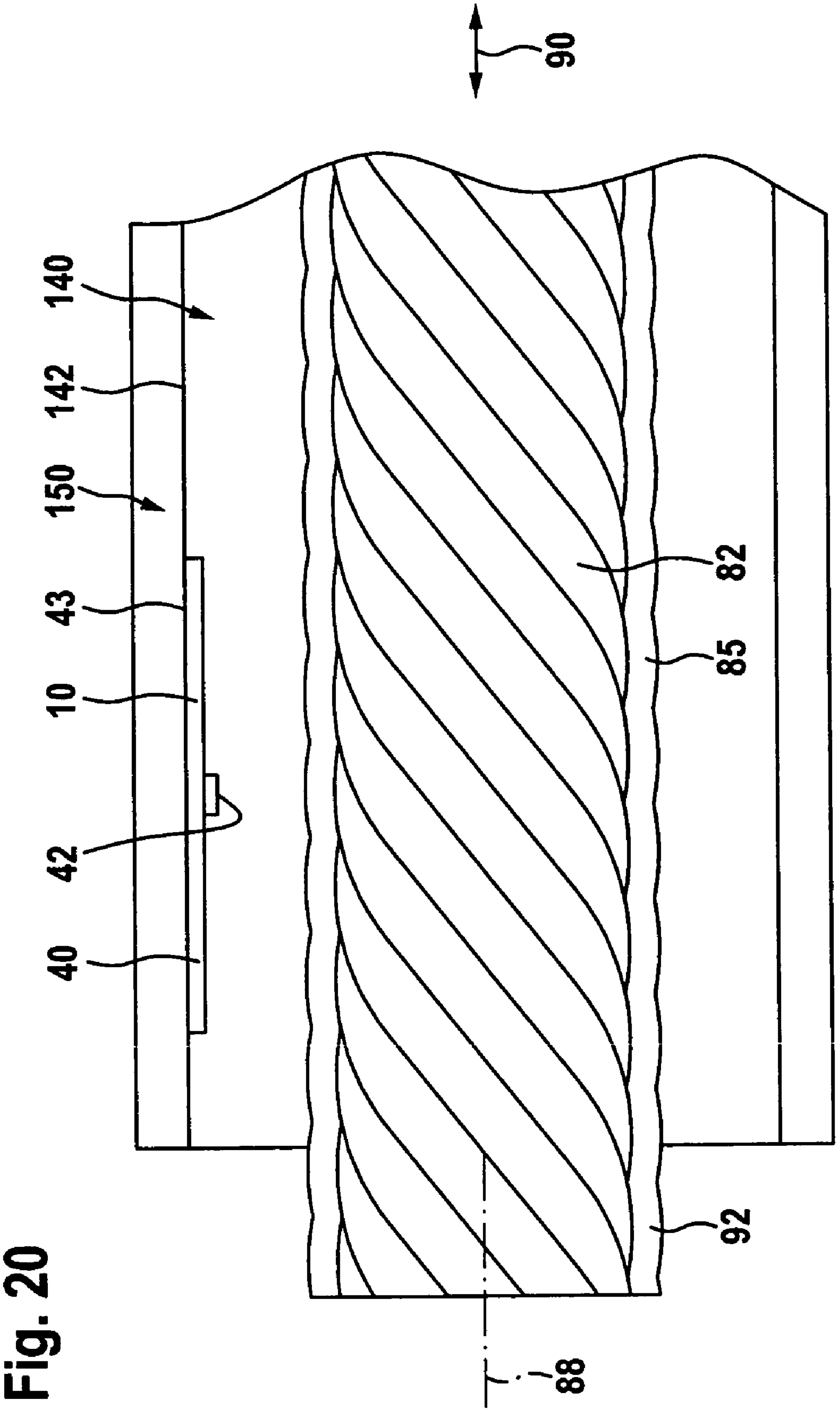
FIG. 20 shows a sectional representation similar to FIG. 11 through the fifth exemplary embodiment of the cable according to the invention in the region of the information carrier unit.

In the case of a fifth exemplary embodiment of a cable 80'''' according to the invention, represented in FIG. 19 and FIG. 20, the inner cable body 82 is surrounded by an intermediate sheath 140, it being possible, but not necessary, for a separating layer 92 to be provided between the inner cable body 82 and the intermediate sheath 140.

The intermediate sheath 140 is part of the cable sheath 102' and is additionally enclosed by a further part of the cable sheath 102', that is the outer sheath 150, so that the intermediate sheath 140 and the outer sheath 150 make up the cable sheath 102'.

The intermediate sheath 140 has, for example, a thickness which is greater than that of the outer sheath 150, so that the outer sheath 150 primarily performs an outer protective function for the intermediate sheath 140.

As represented in FIGS. 19 and 20, an information carrier unit 10 according to the first exemplary embodiment is placed in the intermediate sheath 140, the base 40 lying with a side 43 that is opposite from the integrated circuit 42 and the sensor 30 such that it finishes approximately with a surface 142 of the intermediate sheath 140, so that the information carrier unit 10 does not substantially protrude beyond the surface 142 of the intermediate sheath 140.

If it is made sufficiently thick, an intermediate sheath 140 of this kind makes it possible, in spite of a very undulating surface 85 of the inner cable body 82, caused by the twisted conductor strands 84 and the resultant interstices, which also cannot be completely compensated by inserted interstitial cords, to create a substantially non-undulating or smooth surface 142 for the information carrier unit 10, in particular a solid unit according to the first or third exemplary embodiment, so that no impairment of the information carrier unit 10 can occur due to the undulating surface during the bending of the cable, in particular impairment of the durability of the connections in the region of the external connecting points 48 and the durability of the conductor track 44 on the base 40.

Consequently, both the base 40 and, in particular, the integrated circuit 42 and the sensor 30 are preferably at least partially embedded in the intermediate sheath 140, and the outer sheath 150 merely serves once again as an outer covering over the intermediate sheath 140 with the information carrier unit 10, and consequently also protects, in particular, the information carrier unit 10.

It is also ensured by the blunt edge regions 41 of the base 40 that no damage to the intermediate sheath 140 or the outer sheath 150 occurs during the bending of the cable 80''''.

If, for example, the sensor 30 is formed according to the first variant corresponding to FIG. 3, it is possible, for example, for the sensor 30 to pick up externally acting physical radiation, the temperature or the moisture in the cable sheath 102', in particular in the region of the intermediate sheath 140.

If, for example, the sensor 30 is formed according to the third exemplary embodiment corresponding to FIG. 8 or 9, tension or elongation in the cable sheath 102' can be picked up if the substrate 62 or 62' is fixed to the intermediate sheath 140 and follows elongational movements of the same.

It is consequently possible, for example, to sense mechanical overloading of the cable sheath 102'.

In particular, the outer sheath 150 is produced from a transparent material, so that the position of the information carrier unit 10 on the intermediate sheath 140 can be seen from the outside, in particular when the base 40 is of a color that is distinctly different from the color of the material of the intermediate sheath 140.

Figure 21:
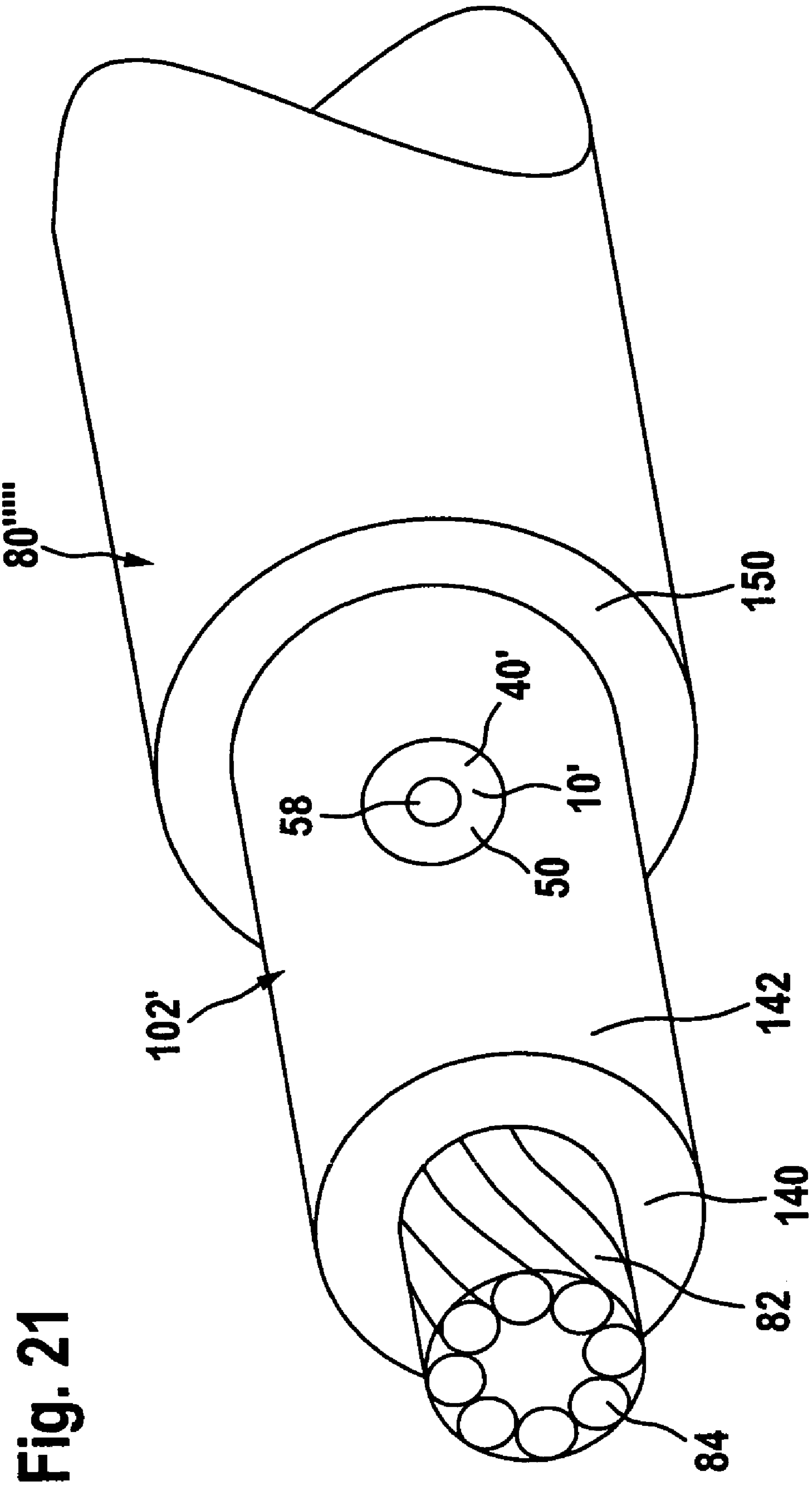
FIG. 21 shows a perspective representation similar to FIG. 10 of a sixth exemplary embodiment of the cable according to the invention.
Figure 22:
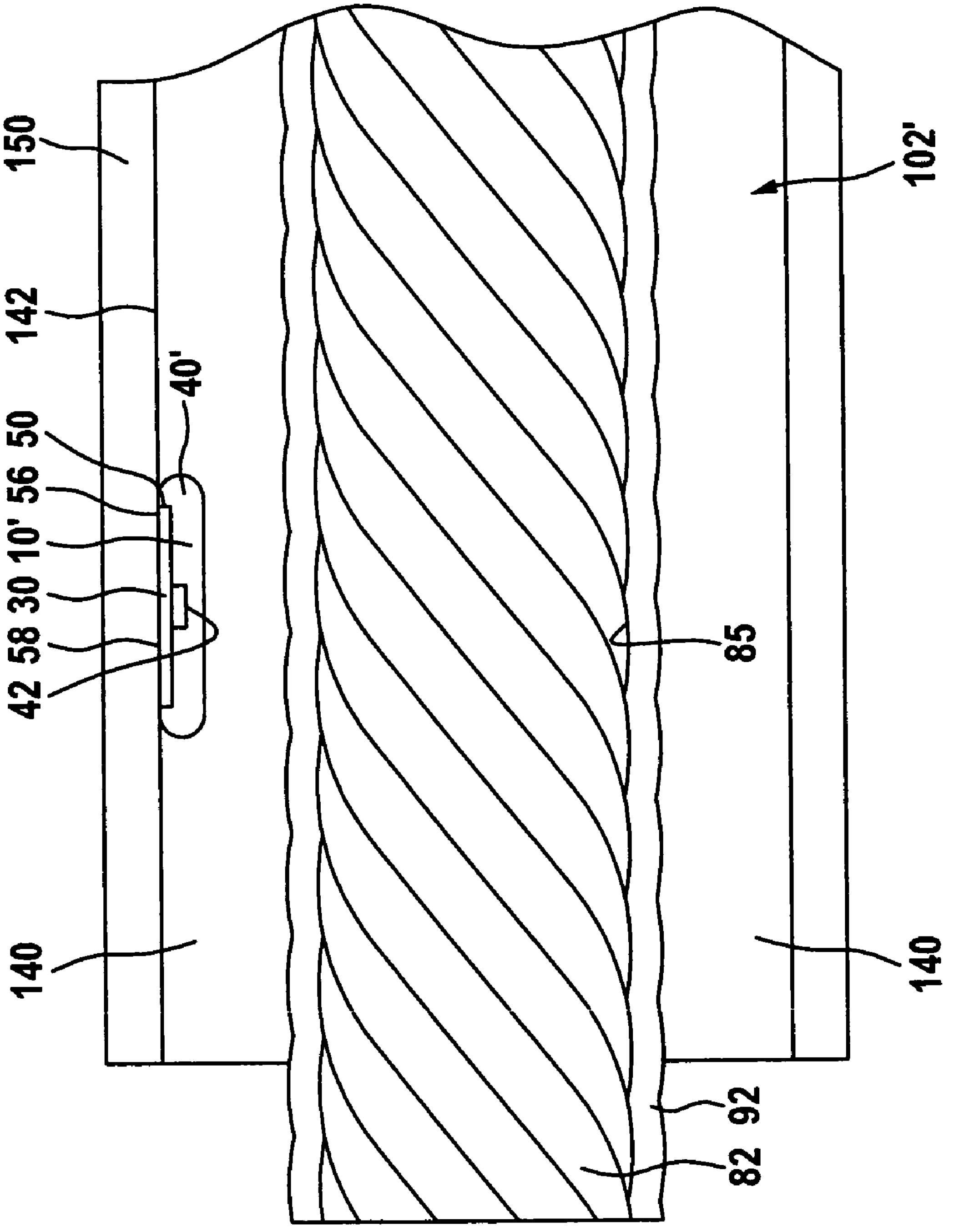
FIG. 22 shows a sectional representation similar to FIG. 11 through the sixth exemplary embodiment of the cable according to the invention in the region of the information carrier unit and FIG. 23 shows a sectional representation similar to FIG. 11 through a seventh exemplary embodiment of a cable according to the invention.

However, an information carrier unit 10' according to the second exemplary embodiment can also be integrated in the intermediate sheath 140 of a sixth exemplary embodiment of the cable 80''''' according to the invention, as represented in FIG. 21 and FIG. 22.

The carrier 40' is in this case likewise embedded such that it is partially enclosed in the intermediate sheath 140, to be precise in such a way that the side of the carrier and the sensor surface 58 are approximately flush with the surface 142 of the intermediate sheath 140, and consequently do not substantially protrude beyond the intermediate sheath 140, so that the outer sheath 150 can likewise cover over both the intermediate sheath 140 and the information carrier unit 10'.

Also in the case of this configuration of the information carrier unit 10'', it is ensured by the rounded edge regions 41' that no damage to the intermediate sheath 140 or the outer sheath 150 takes place during the bending of the cable 80'''''.

If, for example, the sensor 30 is a moisture sensor, it is possible to detect, at an early stage, with the sensor surface 58, penetration of moisture through the outer sheath 150, even at the surface 142 of the intermediate sheath 140 in the cable sheath 102', before moisture penetrates through the intermediate sheath 140 and reaches the inner cable body 82, so that measures which prevent the cable 80''''' from being damaged by moisture penetrating into the inner cable body 82 can be taken at an early stage.

Even if the overall size of the information carrier unit 10' is such that it cannot be embedded in the intermediate sheath 140 within the outer surface 142, but still protrudes beyond the outer surface 142 of the intermediate sheath 140, there is still the possibility of achieving adequate coverage of the information carrier unit 10', and consequently protection of said unit from external effects, by the outer sheath 150.

Figure 23:
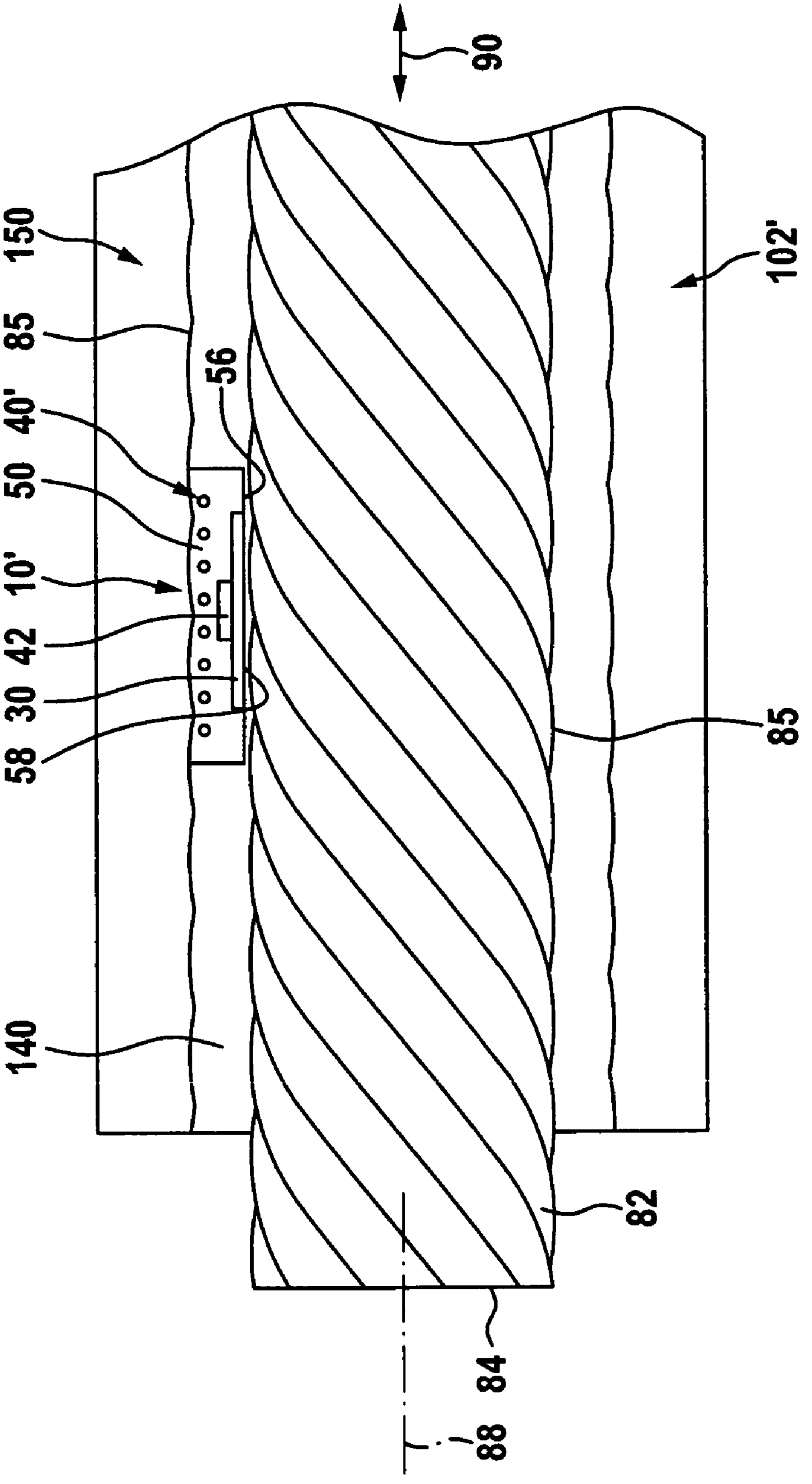

In the case of a seventh exemplary embodiment of a cable 80'''''' according to the invention, represented in FIG. 23, the intermediate sheath 140 is formed with approximately the same thickness as the embedding body 50 of the information carrier unit 10' according to the second exemplary embodiment, so that, with substantially complete embedding of the embedding body 50 in the intermediate sheath 140 and with alignment of the sensor surface 58 such that it is facing the inner cable body 82 and lies substantially on the surface 85 of the inner cable body 82, the sensor 30 can, for example, pick up the temperature or pressure or moisture of the inner cable body 82 in an approximate manner.

The fixing of the information carrier unit 10 or 10' in the case of the fifth exemplary embodiment according to FIGS. 19 and 20 or in the case of the sixth exemplary embodiment according to FIGS. 21 and 22 or in the case of the seventh exemplary embodiment according to FIG. 23 takes place by the information carrier unit or 10' being pressed into the intermediate sheath 140 when the latter is in a plastic state after its extrusion, and consequently the intermediate sheath 140 is so soft that it can receive the information carrier unit 10 or 10' such that it is embedded at least partially within its outer surface 142.

The invention claimed is:

1. Cable, comprising:

an inner cable body, in which at least one conductor strand of an optical and/or electrical conductor runs in a longitudinal direction of the cable, a cable sheath, enclosing the inner cable body and lying between an outer surface of the cable and the inner cable body, a sensor located within the outer surface of the cable for sensing at least one state variable of the cable, and at least one information carrier unit disposed within the outer surface of the cable, the at least one information carrier unit being adapted to be read by electromagnetic field coupling, the at least one information carrier unit picking up at least one measured value of the at least one state variable sensed by the sensor, wherein the measured value can be read out from the information carrier by a read device.

2. Cable according to claim 1, wherein the at least one state variable comprises at least one of radiation, temperature, tension, pressure and moisture.

3. Cable according to claim 1, wherein the sensor is a sensor which reacts irreversibly to the state variable to be sensed.

4. Cable according to claim 1, wherein the sensor is a sensor which reacts reversibly to the state variable to be sensed.

5. Cable according to claim 1, wherein the at least one information carrier unit is adapted to be activated and picks up the at least one measured value in an activated state.

6. Cable according to claim 1, wherein the at least one information carrier unit stores the at least one measured value in a memory.

7. Cable according to claim 6, wherein the at least one information carrier unit only stores the at least one measured value in the memory if the at least one measured value exceeds a threshold.

8. Cable according to claim 6, wherein the at least one information carrier unit only stores the at least one measured value in the memory if the at least one measured value lies outside a statistically determined measured value distribution.

9. Cable according to claim 1, wherein the at least one state variable comprises state variables of the inner cable body.

10. Cable according to claim 1, wherein the at least one state variable comprises state variables of the cable sheath.

11. Cable according to claim 1, wherein the at least one state variable comprises state variables between the inner cable body and the cable sheath.

12. Cable according to claim 1, wherein a multiplicity of information carrier units is provided in the cable and each of the information carrier units can be individually addressed by an access code.

13. Cable according to claim 1, wherein:

a carrier strand is associated with the inner cable body, the carrier strand running over a length of the inner cable body, the at least one information carrier unit is disposed on the carrier strand, and the carrier strand is covered over by the cable sheath.

14. Cable according to claim 13, wherein the carrier strand runs parallel to a longitudinal direction of the inner cable body.

15. Cable according to claim 13, wherein the carrier strand is formed as a filler tape.

16. Cable according to claim 13, wherein the carrier strand wraps around the at least one conductor strand of the inner cable body.

17. Cable according to claim 13, wherein the carrier strand lies directly on the inner cable body.

18. Cable according to claim 13, wherein the carrier strand is at least part of a separating layer between the inner cable body and the cable sheath.

19. Cable according to claim 13, wherein the at least one information carrier unit is disposed on a side of the carrier strand that is facing the inner cable body or on a side of the carrier strand that is facing away from the inner cable body.

20. Cable according to claim 13, wherein the sensor is disposed on the carrier strand.

* * * * *